United States Patent [19]
Mihara et al.

[11] Patent Number: 5,315,412
[45] Date of Patent: May 24, 1994

[54] MULTI-CHIP COLOR IMAGE SENSOR WITH LIGHT-RECEIVING WINDOWS ARRANGED TO PROVIDE SENSOR OUTPUT SIGNALS CORRESPONDING TO THE GAP BETWEEN ADJACENT SENSORS

[75] Inventors: Akio Mihara, Isehara; Seiji Hashimoto, Yokohama, both of Japan

[73] Assignee: Canon Kabushiki Kaisha, Tokyo, Japan

[21] Appl. No.: 680,692

[22] Filed: Apr. 4, 1991

[30] Foreign Application Priority Data

| | | |
|---|---|---|
| Apr. 6, 1990 [JP] | Japan | 2-90447 |
| Apr. 9, 1990 [JP] | Japan | 2-92050 |
| Apr. 9, 1990 [JP] | Japan | 2-92051 |
| Apr. 9, 1990 [JP] | Japan | 2-92052 |

[51] Int. Cl.⁵ .............................. H04N 9/09
[52] U.S. Cl. ...................... 358/512; 358/483
[58] Field of Search ............... 358/43–44, 358/48, 50, 75–80, 505, 512, 513, 514

[56] References Cited

U.S. PATENT DOCUMENTS

| | | | |
|---|---|---|---|
| 4,249,203 | 2/1981 | Yamanaka | 358/50 |
| 4,691,114 | 9/1987 | Hasegawa | 358/482 |
| 4,712,134 | 12/1987 | Murakami | 358/483 |
| 4,774,592 | 9/1988 | Suzuki | 358/483 |
| 4,985,758 | 1/1991 | Hashimoto | 358/44 |
| 5,018,006 | 5/1991 | Hashimoto | 358/43 |

Primary Examiner—Stephen Brinich
Attorney, Agent, or Firm—Fitzpatrick, Cella, Harper & Scinto

[57] ABSTRACT

In a color photoelectric conversion apparatus in which a plurality of semiconductor image sensors each having a plurality of light-receiving windows are arrayed, and a plurality of light-receiving windows in a main scanning direction constitute one color light-receiving element, the last light-receiving window or at least two light-receiving windows including the last light-receiving window of a first semiconductor image sensor of adjacent semiconductor image sensors, and the first light-receiving window or at least two light-receiving windows including the first light-receiving window of the next semiconductor image sensor constitute one color light-receiving element.

20 Claims, 29 Drawing Sheets

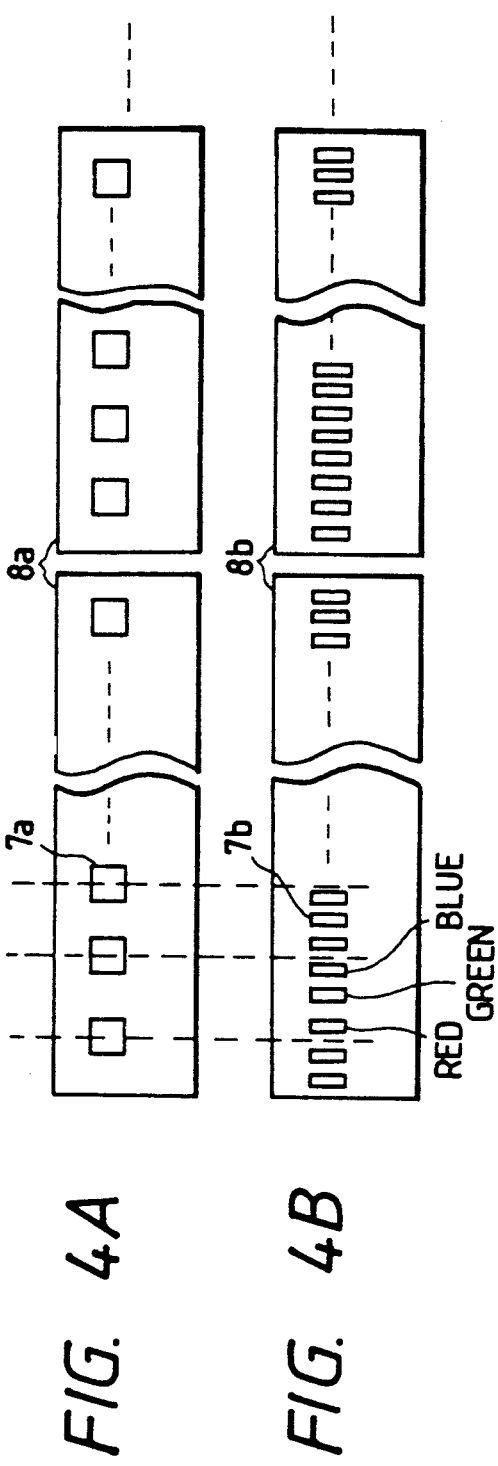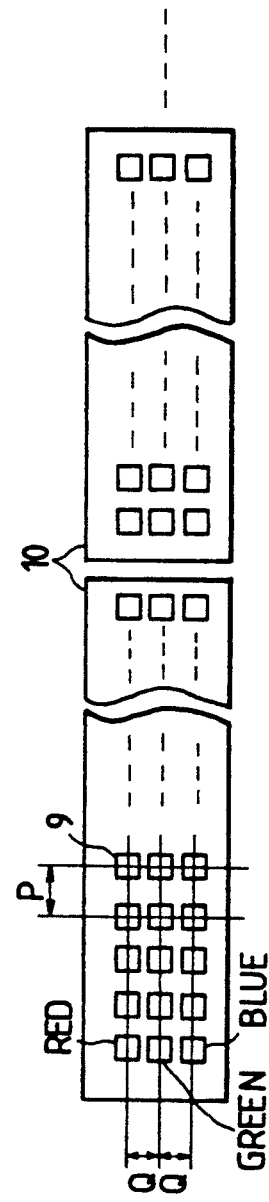
FIG. 4A
FIG. 4B
FIG. 5

R : RED
G : GREEN
B : BLUE $P_2 = P_1 + 2A + B - D$

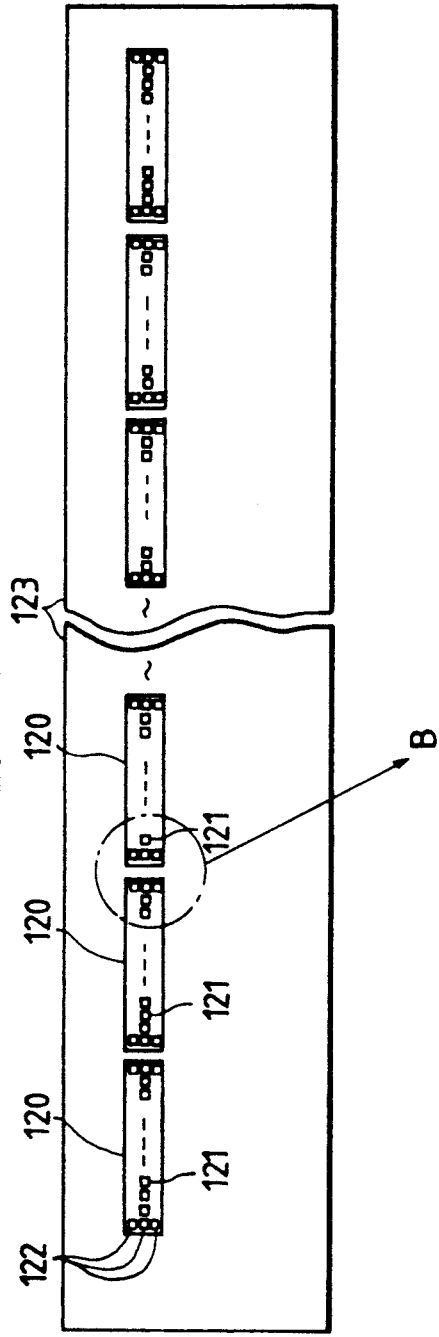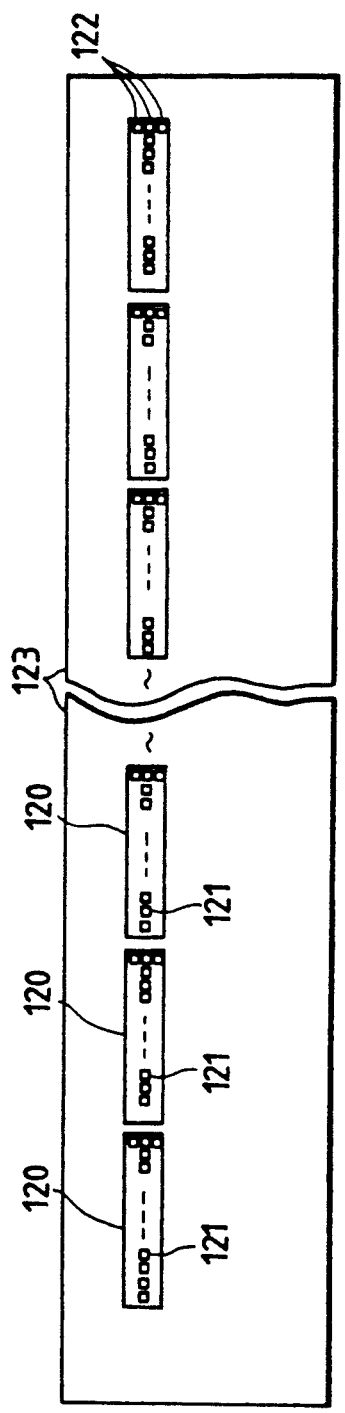

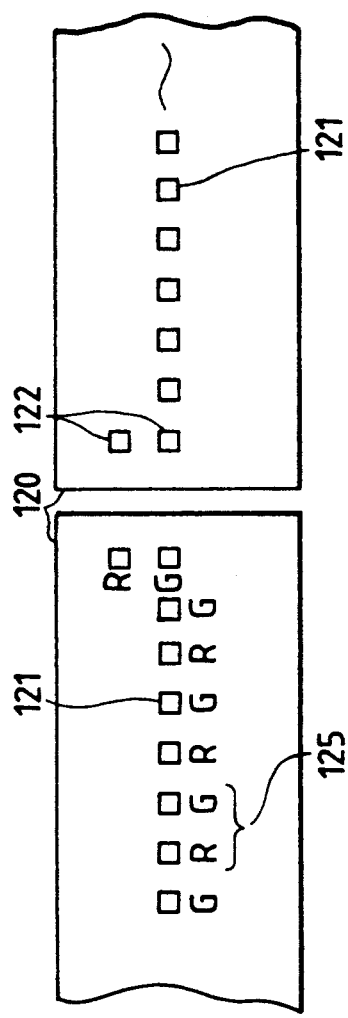
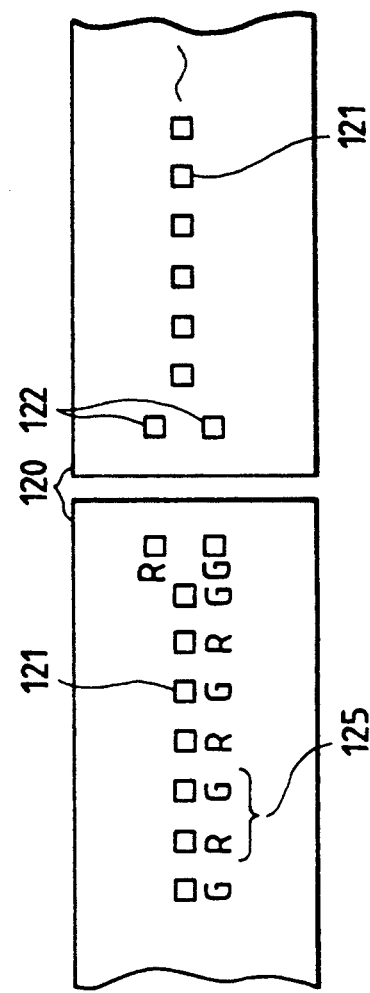
FIG. 21A
FIG. 21B

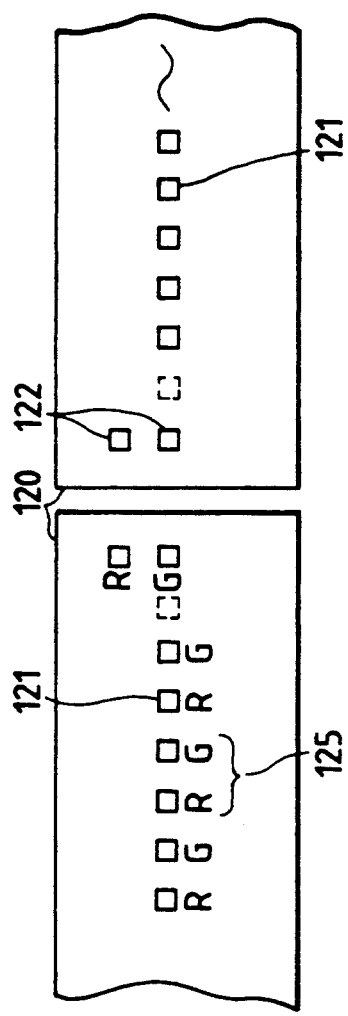
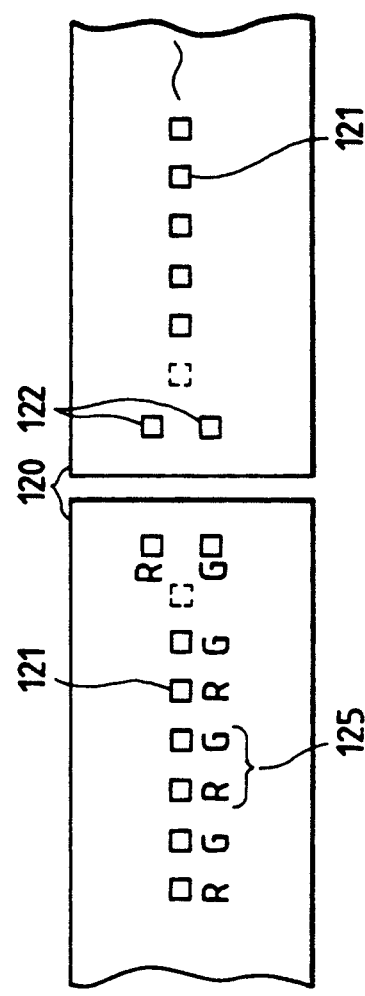
FIG. 22A
FIG. 22B

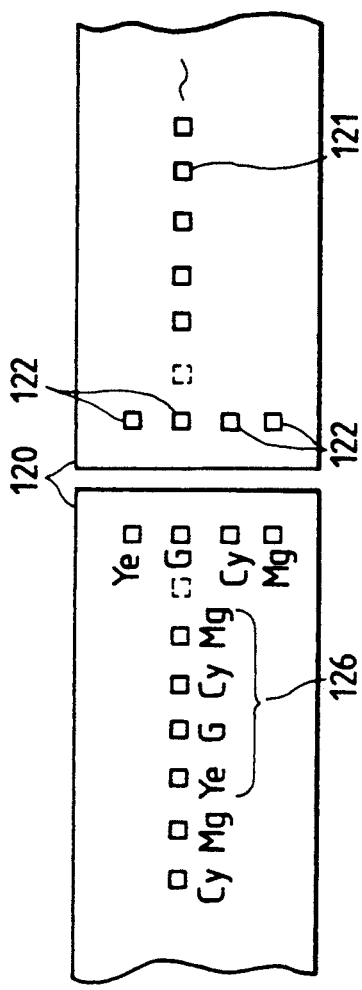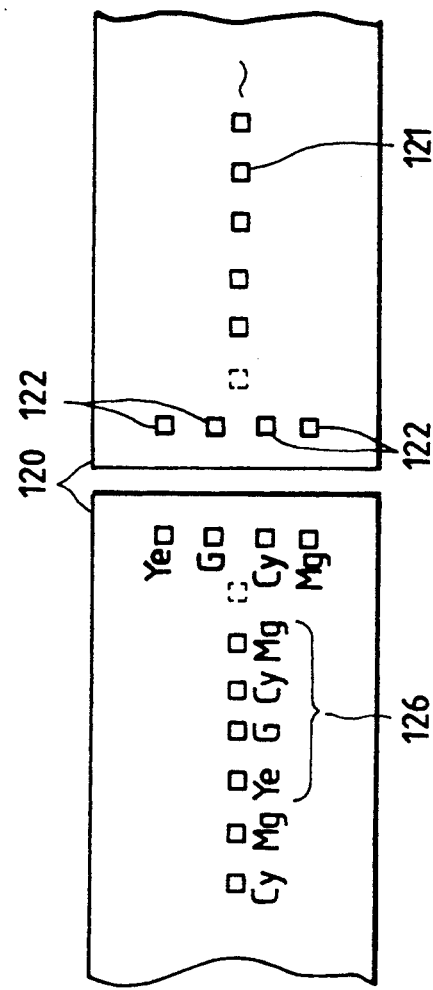
FIG. 24A
FIG. 24B

MULTI-CHIP COLOR IMAGE SENSOR WITH LIGHT-RECEIVING WINDOWS ARRANGED TO PROVIDE SENSOR OUTPUT SIGNALS CORRESPONDING TO THE GAP BETWEEN ADJACENT SENSORS

BACKGROUND OF THE INVENTION

1. Field of the Invention

The present invention relates to a multi-chip color image sensor and, more particularly, to a multi-chip color image sensor in which a plurality of semiconductor image sensors each having a plurality of light-receiving windows are arrayed, and the plurality of windows in a main scanning direction constitute one color light-receiving element.

2. Description of Related Background Art

Conventionally, an original reading unit of, e.g., a facsimile apparatus utilizes semiconductor image sensors such as CCD image sensors, bipolar image sensors, and the like, whose light-receiving windows are aligned in a line.

In general, as a system of using these sensors, a so-called multi-chip system is known. In this system, a plurality of semiconductor image sensor chips each having a length of several mm to several tens of mm are arrayed to have the same size as an original to be read, and the sensor array is used as a proximity image sensor using a one-to-one correspondence optical system, e.g., a SELFOC lens array (trade name, available from Nippon Sheet Glass Co. Ltd.)

FIG. 1 is a schematic plan view of multi-chip system semiconductor image sensors.

FIG. 2 is an enlarged view of a portion A of the multi-chip system semiconductor image sensors.

FIG. 3 is a diagram showing an optical system using the multi-chip system semiconductor image sensors.

FIGS. 1 and 3 illustrate an original 1, a circuit board 4 for mounting semiconductor image sensors, on which a desired circuit is arranged, semiconductor image sensors $S_1$ to $S_n$ which are aligned in a line, a SELFOC lens array 5, and an original illumination LED 6.

In FIG. 2, light-receiving windows 7 of each semiconductor image sensor are aligned in a line.

The multi-chip system semiconductor image sensors have the following features. That is, they do not require a reduction optical system, and can be rendered compact. Thus, the multi-chip system semiconductor image sensors are widely used in image processing apparatuses such as facsimile apparatuses.

In recent years, a demand has arisen for color sensors in addition to the above-mentioned monochrome semiconductor image sensors. As a most general system for realizing a color system, the above-described multi-chip system semiconductor image sensors have been examined. For example, the following three systems are proposed.

In the first system, a pixel (light-receiving window) pitch is set to be ⅓ that of a monochrome image sensor, and RED, GREEN, and BLUE color filters are arranged on the light-receiving windows in turn to constitute a light-receiving unit for one line, so that outputs from three adjacent light-receiving windows, i.e., RED, GREEN, and BLUE light-receiving windows are defined as one color dot (one color light-receiving element).

FIG. 4A is an explanatory view showing an arrangement of light-receiving windows for monochrome sensors, and FIG. 4B is an explanatory view showing an arrangement of light-receiving windows for color sensors.

In FIGS. 4A and 4B, semiconductor image sensors $8a$ and $8b$ respectively have light-receiving windows $7a$ and $7b$. A pitch (a light-receiving window pitch in the main scanning direction) of the light-receiving windows $7b$ of the color sensors is ⅓ a pitch (light-receiving window pitch in the main scanning direction) of the light-receiving windows $7a$ of the monochrome sensors. RED, GREEN, and BLUE color filters are arranged in turn on the light-receiving windows $7b$. Note that such a system is called an in-line system.

In the second system, the number of lines of the light-receiving windows on the semiconductor image sensors is increased from one to three, and an interval between adjacent lines is set to be the same as or an integer multiple of the light-receiving window pitch in the main scanning direction. For example, when the interval between the adjacent lines is set to be the same as the pitch in the main scanning direction, outputs from the first and second lines are input to a memory, so that the output from the first line is delayed by two lines, and the output from the second line is delayed by one line. Thus, one color dot (one color light-receiving element) is defined by the two delayed outputs and the output from the third line.

FIG. 5 is an explanatory view showing an arrangement of light-receiving windows.

In FIG. 5, semiconductor image sensors 10 have light-receiving windows 9. The light-receiving windows 9 are separated by a pitch P in the main scanning direction, and are separated by a line pitch Q (light-receiving window pitch in the subscanning direction). For example, RED color filters are arranged on the light-receiving windows of the first line, GREEN color filters are arranged on the light-receiving windows of the second line, and BLUE color filters are arranged on the light-receiving windows of the third line.

In the third system, three lines of semiconductor image sensors each having light-receiving windows are arranged, and color filters are arranged in units of lines of semiconductor image sensors.

FIG. 6 is an explanatory view showing an arrangement of semiconductor image sensors.

In FIG. 6, semiconductor image sensors 11, 12, and 13 of the first, second, and third lines have light-receiving windows 7. For example, RED color filters are arranged on the light-receiving windows of the semiconductor image sensor of the first line, GREEN color filters are arranged on the light-receiving windows of the semiconductor image sensors of the second line, and BLUE color filters are arranged on the light-receiving windows of the semiconductor image sensors of the third line.

In the above-mentioned prior art, the subscanning direction corresponds to a direction in which an original to be read is fed, and the main scanning direction corresponds to an array direction of light-receiving windows. A "column" means an array of light-receiving units in the subscanning direction, and a "row" means an array of light-receiving windows in the main scanning direction.

FIG. 7 is an explanatory view showing the main scanning direction and the subscanning direction.

FIG. 7 illustrates a subscanning direction 16, a main scanning direction 17, a read start position 14 of a light-receiving window of the first chip of multi-chip image sensors, and a final read position 15 of the last chip.

However, the multi-chip color image sensors of the above-mentioned three systems suffer from the following problems.

In the in-line system as the first system, for example, a dot pitch at a joint of adjacent chips of the semiconductor image sensors is considerably larger than a regular pitch, as shown in FIG. 8.

In the in-line system, a dot pitch equivalently corresponds to a pitch between adjacent GREEN, RED, or BLUE windows since RED, GREEN, and BLUE light-receiving windows constitute one color dot (one color light-receiving element) in a color sensor. FIG. 8 illustrates a pitch between adjacent GREEN windows.

If a regular pitch is represented by $P_1$ and a pitch at a joint of adjacent semiconductor image sensor is represented by $P_2$, $P_2$ is given by:

$$P_2 = P_1 + 2A + B - D \qquad (1)$$

where A is the distance between an edge of the last light-receiving window and an edge of a semiconductor image sensor chip, B is the gap at a joint between semiconductor image sensors, and D is the distance between adjacent light-receiving windows.

The dot pitch $P_2$ (to be simply referred to as the pitch $P_2$ hereinafter) at a joint between adjacent semiconductor image sensor chips is larger than the regular pitch $P_1$ (to be simply referred to as the pitch $P_1$ hereinafter) by $2A + B - D$.

More specifically, the pitches $P_1$ and $P_2$ are calculated at a resolution of 400 DPI (400 dots per inch).

The pitch $P_1$ is calculated by:

$$P_1 = \frac{25.4 \text{ mm (1 inch)}}{400} = 63.5 \ \mu m$$

A is set to be 20 $\mu$m in consideration of the influence on light-receiving windows when semiconductor image sensors are cut from a semiconductor wafer.

B is set to be about 20 $\mu$m in accordance with die-bonding precision of semiconductor image sensor. D is set to be about 6 $\mu$m in consideration of isolation of light-receiving windows. In this case, the pitch $P_2$ is calculated by substituting $P_1 = 63.5$ $\mu$m, $A = 20$ $\mu$m, $B = 20$ $\mu$m, and $D = 6$ $\mu$m in equation (1) as follows:

$$P_2 = 63.5 \ (\mu m) + 2 \times 20 \ (\mu m) + 20 \ (\mu m) - 6 \ (\mu m)$$
$$= 117.5 \ (\mu m)$$

Therefore, $$\frac{P_2}{P_1} \approx 1.85$$

In a general color sensor, a pitch offset of about 1.85 times the regular pitch forms a nonsensitive band at a joint to cause moiré, and adversely influences an output image.

The 3-line system as the second system can cope with a pitch offset easier than the in-line system, as shown in FIG. 9.

In the 3-line system, since the RED, GREEN, and BLUE color filters are arranged in units of rows, a regular pitch $P_3$ corresponds to a pitch between adjacent color filters, and a dot pitch $P_4$ at a joint of adjacent semiconductor image sensor chips corresponds to a pitch between color filters at end portions of adjacent semiconductor image sensor chips, as shown in FIG. 9.

Assuming that the pitch $P_3$ is set to be 63.5 $\mu$m, and a main scanning length of a light-receiving window is set to be 30 $\mu$m, the dot pitch $P_4$ is calculated by:

$$P_4 = 2A + B + 30 \ (\mu m) = 90 \ (\mu m)$$

At this time, the pitch $P_4$ is about 1.42 times the pitch $P_3$. This value poses no problem on an output image since a pitch offset which influences an image is 1.5 times or more the regular pitch in general. However, the 3-line system requires an external memory, and the entire system is completed, resulting in an increase in cost.

The third system requires a memory having a larger capacity than that required in the 3-line system described above, and mounting precision of semiconductor image sensors must be improved. Therefore, it is considerably difficult to realize the third method.

In order to prevent formation of the nonsensitive band in the main scanning direction, another system is proposed. In this system, as shown in FIGS. 10A and 10B, every other sensors are offset in the subscanning direction, and overlap each other in the main scanning direction.

A sensor arrangement in which a plurality of chips are alternately arranged on a circuit board 1, as shown in FIGS. 10A and 10B, is called a staggered arrangement. The staggered sensors have the following feature. That is, there is no change in resolution at a joint between adjacent chips since a pitch of color filters need not be changed for data at the joint between the adjacent chips.

However, the staggered sensors require a space d between adjacent sensors, which space is considerably wider than a pitch x between adjacent color filters. Thus, a memory having a large capacity is required to synchronize output signals from the sensors.

As described above, the above-mentioned systems for constituting the multi-chip color image sensors suffer from their own problems. The in-line system as the first system has received a lot of attention due to its advantages, e.g., a simple system, a possibility of a reduction in cost, and the like, since it does not require a memory.

SUMMARY OF THE INVENTION

It is the first object of the present invention to solve a problem of omission of original data at a joint between semiconductor image sensor chips (portions A and B in FIG. 8) as the problem of the in-line system.

According to an embodiment of the present invention, there is provided a multi-chip color image sensor system in which a plurality of semiconductor image sensors each having a plurality of light-receiving windows are arrayed, and the plurality of light-receiving windows in the main scanning direction constitute one color light-receiving element, wherein the last light-receiving window or at least two light-receiving windows including the last light-receiving window of the first semiconductor image sensor of adjacent semiconductor image sensors, and the first light-receiving window or at least two light-receiving windows including the first light-receiving window of the second semiconductor image sensor constitute one color light-receiving element.

In the in-line system, original data at a joint between semiconductor image sensors is omitted since one color dot E (one color light-receiving element) is constituted in each semiconductor image sensor chip, as shown in FIG. 8.

According to the present invention, the last light-receiving window or at least two light-receiving windows including the last light-receiving window of the first semiconductor image sensor of the adjacent semiconductor image sensors, and the first light-receiving window or at least two light-receiving windows including the first light-receiving window of the second semiconductor image sensor constitute one color light-receiving element. Therefore, one color dot (one color light-receiving element) is constituted to extend over the adjacent semiconductor image sensors.

According to another embodiment of the present invention, there is provided a multi-chip color image sensor system in which a plurality of semiconductor image sensors each having a plurality of light-receiving windows are arrayed, and the plurality of light-receiving windows in the main scanning direction constitute one color light-receiving element, wherein some or all of the plurality of light-receiving windows constituting the color light-receiving element at an end portion of the semiconductor image sensor are juxtaposed in a subscanning direction.

A description "juxtaposed in a subscanning direction" is not limited to a case wherein a plurality of light-receiving windows are arranged in a direction perpendicular to the main scanning direction, but includes a case wherein a plurality of light-receiving windows are arranged to be not parallel to the subscanning direction. In addition, a plurality of light-receiving windows may not be linearly arranged. In the embodiment to be described later, a case will be exemplified for the sake of simplicity wherein a plurality of light-receiving windows are arranged in a direction perpendicular to the main scanning direction (parallel to the subscanning direction).

In the conventional in-line system multi-chip color image sensor, the pitch $P_2$ is a sum of the pitch $P_1$ and $2A+B-D$, as has already been described above with reference to FIG. 8.

In this embodiment, since three light-receiving windows constituting the color light-receiving element at the end portion of the semiconductor image sensor are juxtaposed in the subscanning direction, a dot pitch $P_4$ at a joint between adjacent semiconductor image sensor chips is defined as a pitch between the central positions in the main scanning direction of a plurality of light-receiving windows juxtaposed in the subscanning direction of the adjacent semiconductor image sensors. According to the present invention, the pitch $P_4$ is a sum of $2A+B$ and a main scanning length L of the light-receiving window, i.e., $P_4=2A+B+L$.

More specifically, the difference between the conventional dot pitch $P_2$ and the dot pitch $P_4$ of the present invention is calculated to be:

$$P_2 - P_4 = (P_1 + 2A + B - D) - (2A + B + L)$$
$$= P_1 - D - L$$

Since $P_1$ is given by $P_1=3D+3L$ (assuming that the prior art and the present invention have the same length L of the light-receiving window and the same distance D between adjacent light-receiving windows), we have:

$$P_2 - P_4 = 2(D+L) > 0$$

In this embodiment, the dot pitch at the joint between adjacent semiconductor image sensor chips can be smaller than that of the conventional in-line system multi-chip color image sensor.

In the multi-chip color image sensor of the present invention, an output signal from at least one of the light-receiving windows juxtaposed in the subscanning direction can be processed as an output signal from a region corresponding to a joint of adjacent semiconductor image sensors.

According to still another embodiment of the present invention, there is provided a color photoelectric conversion apparatus which has a plurality of pixels each having a plurality of color filters, and in which a plurality of color photoelectric transducers constituted by arranging the plurality of pixels in the main scanning direction are arranged in the main scanning direction, wherein at least two pixels are juxtaposed in a direction perpendicular to the main scanning direction on an end portion of a pixel array arranged in the main scanning direction of each of adjacent color photoelectric transducers, and an output signal from at least one of the at least two juxtaposed pixels is output from each of the adjacent color photoelectric transducers, and is used as an output signal from a region corresponding to a joint between the adjacent color photoelectric transducers.

In this embodiment, at least two pixels are juxtaposed in a direction perpendicular to the main scanning direction (array direction of pixels) on an end portion of a pixel array arranged in the main scanning direction of each of adjacent color photoelectric transducers, and an output signal from at least the other one of the at least two juxtaposed pixels, excluding one pixel, is output from each of the adjacent color photoelectric transducers, and is used as an output signal from a region corresponding to the joint between the adjacent color photoelectric transducer. Thus, data of a region corresponding to a joint can be read.

In this embodiment, a pixel means one constituting unit of a sensor including color filters, photoelectric conversion regions, and the like.

According to still another embodiment of the present invention, there is provided a color photoelectric conversion apparatus which has a plurality of pixels each having a plurality of color filters, and in which a plurality of color photoelectric transducers constituted by arranging the plurality of pixels in the main scanning direction are arranged in the main scanning direction, wherein at least two pixels are juxtaposed in a direction perpendicular to the main scanning direction on an end portion of a pixel array arranged in the main scanning direction of at least one of adjacent color photoelectric transducers, and an output signal from at least one of the at least two juxtaposed pixels is used as an output signal from a region corresponding to a joint between the adjacent color photoelectric transducers.

In this embodiment, at least two pixels are juxtaposed in a direction perpendicular to the main scanning direction (array direction of pixels) on an end portion of a pixel array arranged in the main scanning direction of at least one of the adjacent color photoelectric transducers, and an output signal from the other pixel of the at least two juxtaposed pixels, excluding one pixel, is used as an output signal from a region corresponding to a joint between the adjacent color photoelectric transducers. Thus, data of a region corresponding to the joint can be read.

In this embodiment, a pixel means one constituting unit of a sensor including color filters, photoelectric conversion regions, and the like.

Other objects and features of the present invention will become apparent from the following description taken in conjunction with the accompanying drawings.

BRIEF DESCRIPTION OF THE DRAWINGS

FIG. 4A is an explanatory view showing an arrangement of light-receiving windows in a monochrome sensor, and FIG. 4B is an explanatory view showing an arrangement of light-receiving windows in a color sensor;

FIG. 5 is an explanatory view showing an arrangement of light-receiving windows;

FIGS. 16 and 17 are schematic plan views of the overall structures of multi-chip color image sensors according to the sixth to 22nd embodiments of the present invention;

FIGS. 21A and 21B are partial enlarged views of multi-chip color image sensors according to the 11th and 12th embodiments of the present invention;

FIGS. 22A and 22B are partial enlarged views of multi-chip color image sensors according to the 13th and 14th embodiments of the present invention;

FIGS. 24A and 24B are partial enlarged views of multi-chip color image sensors according to the 17th and 18th embodiments of the present invention;

DETAILED DESCRIPTION OF THE PREFERRED EMBODIMENTS

An embodiment of the present invention will be described below with reference to the accompanying drawings.

Prior to a description of an arrangement of three light-receiving windows constituting a color light-receiving element as a characteristic feature of the present invention, an arrangement of a multi-chip color image sensor will be described below.

Figure 11:
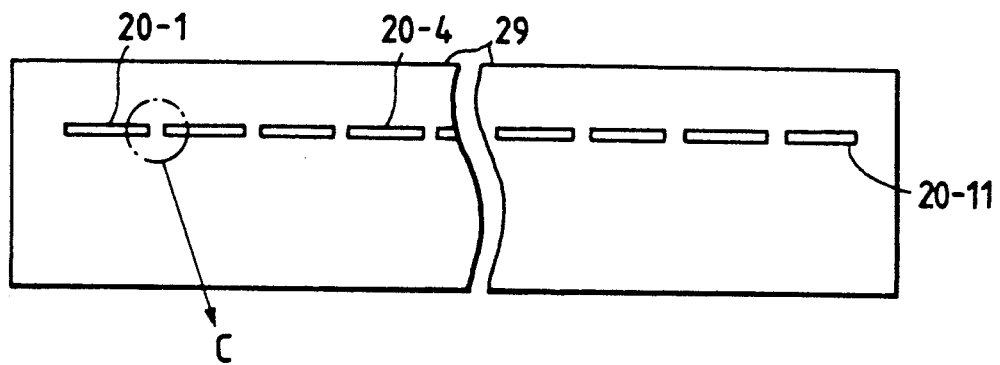
FIG. 11 is a schematic plan view showing a multi-chip color image sensor according to the first embodiment of the present invention.

FIG. 11 is a schematic plan view of a multi-chip color image sensor according to the first embodiment of the present invention.

As shown in FIG. 11, 11 semiconductor image sensor chips 20-1 to 20-11 are arranged on a circuit board 29 having a desired circuit pattern. Note that 20-1 designates the first semiconductor image sensor chip, and 20-11 designates the 11th (last) semiconductor image sensor chip.

Figure 12:
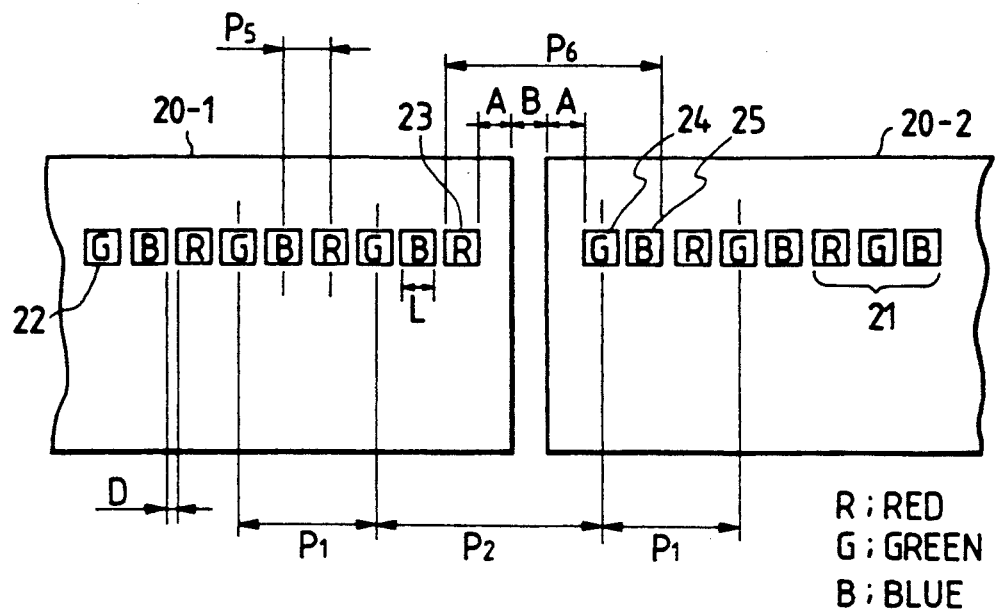
FIG. 12 is a partial enlarged view of the multi-chip color image sensor according to the first embodiment of the present invention, and shows an arrangement of light-receiving windows.

FIG. 12 is an enlarged view of a portion C of the multi-chip color image sensor, and shows an arrangement of light-receiving windows.

Figure 7:
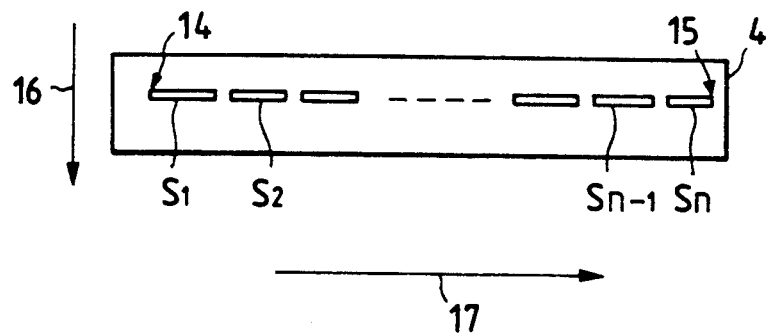
FIG. 7 is an explanatory view showing a main scanning direction and a subscanning direction.

Geometrical dimensions of the arrangement of light-receiving windows to be described below are the same as those in the in-line system multi-chip color image sensor shown in FIG. 7.

The first embodiment employs a semiconductor image sensor on which light-receiving window groups (three light-receiving windows constitute one color dot, e.g., 21 in FIG. 12) each constituting one color dot (one color light-receiving element) are sequentially arranged in the main scanning direction at a resolution of 400 DPI, i.e., at a 63.5-$\mu$m pitch (pitch $P_1$ in FIG. 12). 948 light-receiving windows are linearly arranged in the main scanning direction on one semiconductor image sensor.

Figure 8:
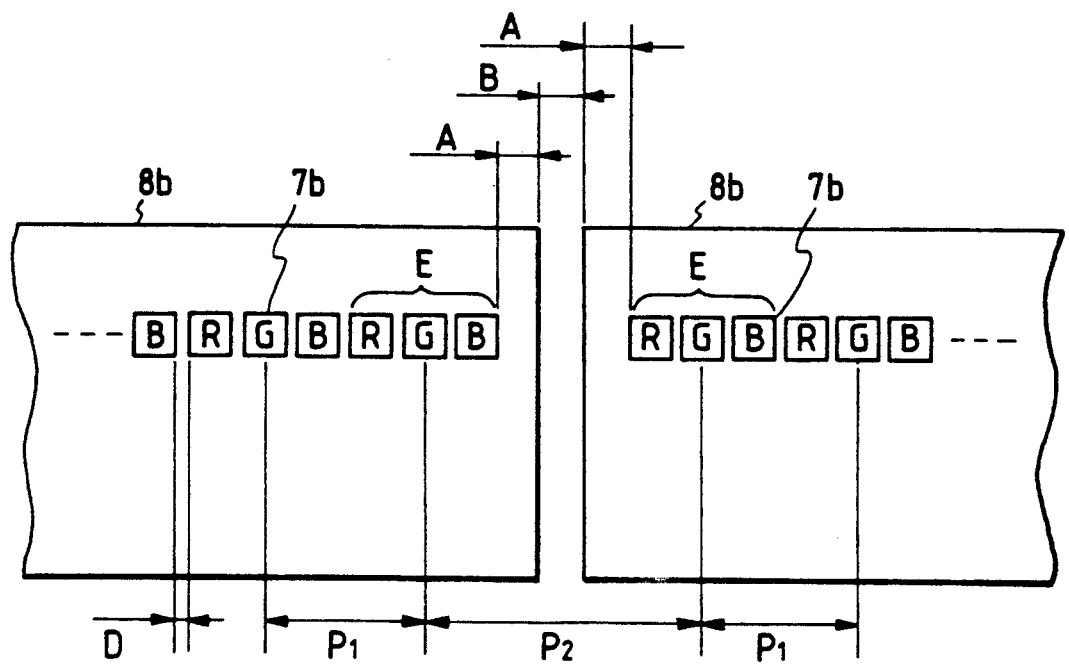
FIG. 8 is an explanatory view showing an arrangement of light-receiving windows of an in-line system multi-chip color image sensor.
Figure 9:
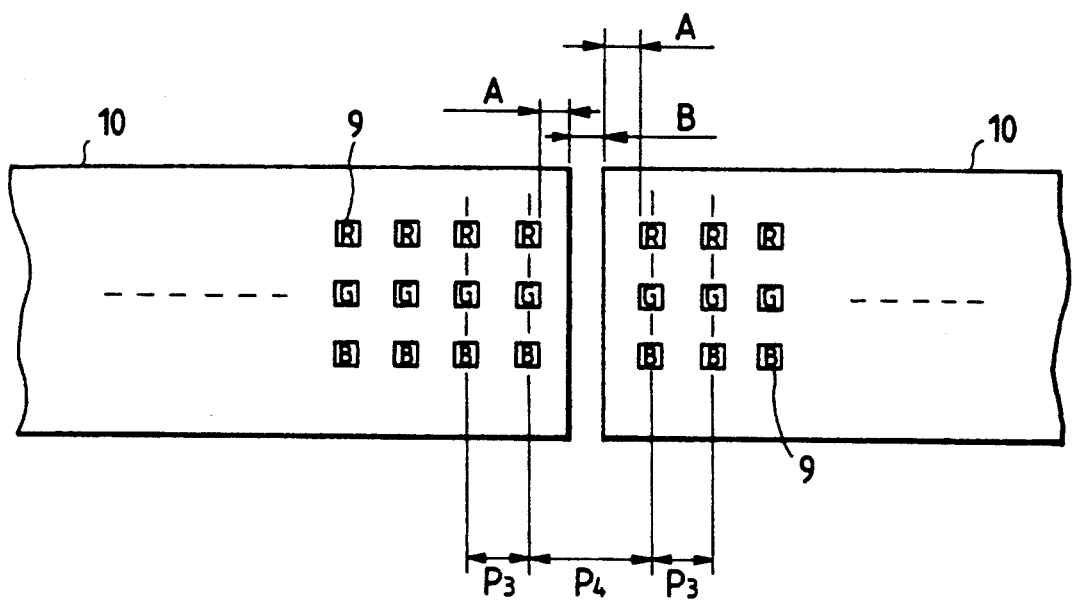
FIG. 9 is an explanatory view showing an arrangement of light-receiving windows of a conventional 3-line system multi-chip color image sensor.
Figure 10A:
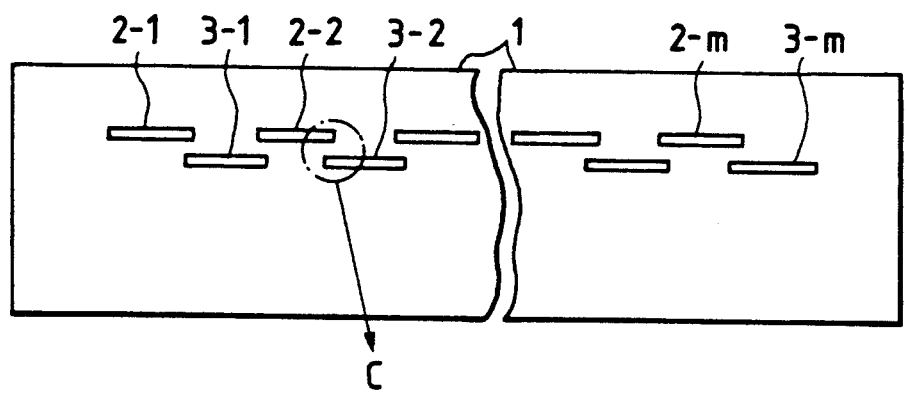
FIGS. 10A and 10B are views showing an arrangement of light-receiving units and an arrangement of color filters in the conventional multi-chip type semiconductor image sensor.
Figure 10B:
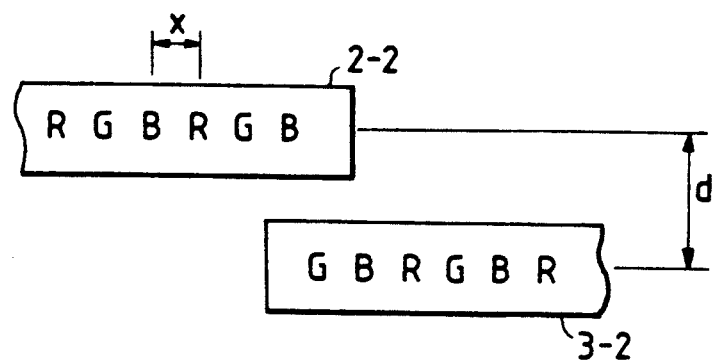

Note that in FIG. 12, pitches $P_1$ and $P_2$ respectively represent a regular pitch, and a pitch at a joint of adjacent semiconductor image sensor chips in the same manner as the pitches $P_1$ and $P_2$ shown in FIG. 8.

A main scanning length L of each light-receiving window is set to be 15 $\mu$m, and a distance D between adjacent light-receiving windows is set to be about 6 $\mu$m for isolation of the light-receiving windows, and wiring. In order to set a pitch of the every three light-receiving windows to be 63.5 $\mu$m, a fraction of a pitch $P_5$ between adjacent light-receiving windows is absorbed by the region D for isolation and wiring. For the sake of easy understanding in the following embodiments, a fraction included in the region D will be ignored, and D is assumed to be 6 $\mu$m. The main scanning length of this semiconductor image sensor chip is about 20 mm, and 11 chips are arranged, so that the light-receiving windows are linearly arranged, thereby realizing an A4-size read width.

Note that B is a value determined depending on, e.g., a device for die-bonding semiconductor image sensors, and is set to be 20 $\mu$m. A is set to be 20 $\mu$m in consideration of damage to light-receiving windows when semiconductor image sensor chips are cut from a semiconductor wafer by a dicing method.

Three light-receiving windows 21 constituting one color dot in FIG. 12 are constituted by RED, GREEN, and BLUE windows. A first semiconductor image sensor 20-1 of jointed semiconductor image sensors has a last light-receiving window 23, and the next semiconductor image sensor 20-2 has first and second light-receiving windows 24 and 25. The three light-receiving windows constituting one color dot at the joint are constituted by the light-receiving windows 23, 24, and 25. More specifically, one color dot at the joint is arranged to extend over the two semiconductor image sensors.

The characteristic feature of the present invention will be described below with reference to FIG. 12 in comparison with the in-line system multi-chip color image sensor which has been described with reference to FIG. 8.

In the in-line system multi-chip color image sensor shown in FIG. 8, the last three light-receiving windows (R, G, B) of the first one of the jointed semiconductor image sensors, and the first three, i.e., first, second, and third light-receiving windows (R, G, B) of the next semiconductor image sensor constitute different color dots. In this case, original data on portions A and B ($A+B+A=20+20+20=60$ $\mu$m) at a joint of the adjacent semiconductor image sensors is completely omitted, and discontinuity of joints of a plurality of semiconductor image sensors appears in an image output.

In contrast to this, according to the embodiment of the present invention, since three light-receiving windows (23, 24, 25; or 26, 27, 28) constituting one color dot extend over two semiconductor image sensors, original data can be prevented from being completely omitted unlike in the prior art. In FIG. 12 showing this embodiment, original data corresponding to one color dot at the joint can be obtained from a distance $P_6$ ($P_6 = 2A + B + D + 3L = 40 + 20 + 6 + 45$ ($\mu$m)) between outer edges of the last light-receiving window 23 of the semiconductor image sensor 20-1 and the second light-receiving window 25 of the semiconductor sensor 20-2, and the influence of discontinuity of the joint on an image output can be minimized unlike in the prior art.

In this embodiment, since the first and second light-receiving windows of the first semiconductor image sensor 20-1 and the last light-receiving window of the last semiconductor image sensor 20-1 cannot constitute one color dot to be constituted by R, G, and B, it is preferable that they are not used as data outputs for an image output of this embodiment.

Figure 13:
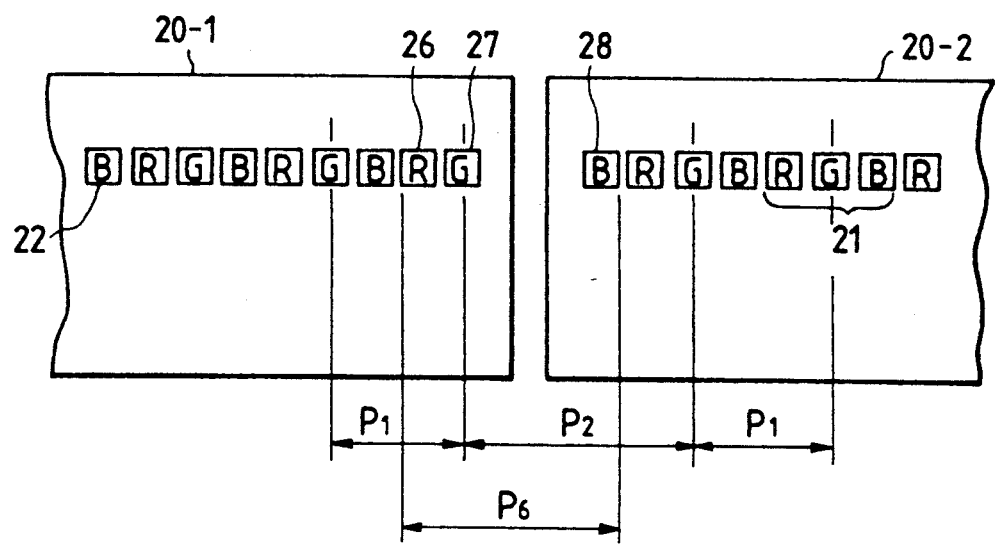
FIG. 13 is a partial enlarged view of a multi-chip color image sensor according to the second embodiment of the present invention.

FIG. 13 is a partial enlarged view of a multi-chip color image sensor according to the second embodiment of the present invention.

In FIG. 13, $P_1$, $P_2$, and $P_6$ respectively designate a regular pitch, a pitch at a joint of adjacent semiconductor image sensors, and a distance between outer edges of a last light-receiving window 23 of a semiconductor image sensor 20-1 and a second light-receiving window 25 of a semiconductor image sensor 20-2 like in the first embodiment.

In this embodiment, unlike in the first embodiment, three light-receiving windows constituting one color dot at a joint are constituted by two last light-receiving windows 26 and 27 of the first semiconductor image sensor 20-1 and a first light-receiving window 28 of the next semiconductor image sensor 20-2. The first and second embodiments can provide the same effect.

For the same reason as in the first embodiment, it is preferable that the first light-receiving window of the first semiconductor image sensor 20-1 and two last light-receiving windows of the last semiconductor image sensor 20-11 are not used as data outputs for an image output.

In the first and second embodiments described above, RED, GREEN, and BLUE color filters have been exemplified. However, other color filters, e.g., cyan, magenta, and yellow color filters may be employed.

In the first and second embodiments described above, three light-receiving windows arranged in the main scanning direction constitute one color light-receiving element. However, the number of light-receiving windows is not limited to this. The present invention can be widely applied to a case wherein a plurality of light-receiving windows constitute one color light-receiving element.

Figure 14:
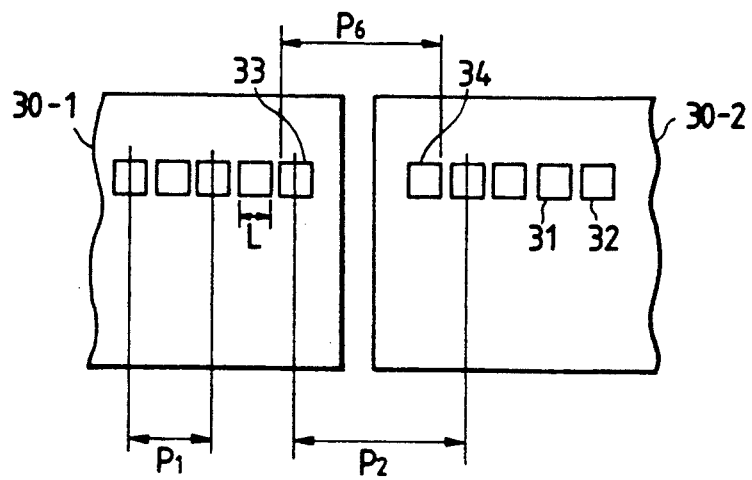
FIG. 14 is a partial enlarged view of a multi-chip color image sensor according to the third embodiment of the present invention.
Figure 15A:
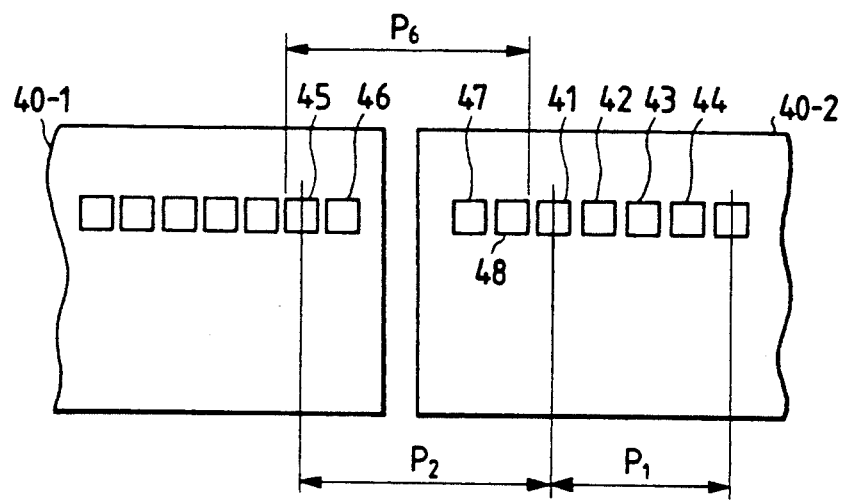
FIGS. 15A and 15B are partial enlarged views of multi-chip color image sensors according to the fourth and fifth embodiments of the present invention.
Figure 15B:
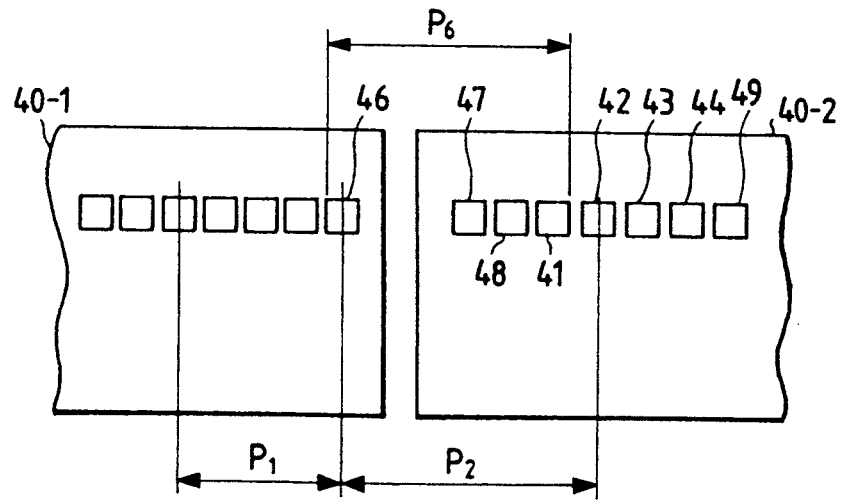

FIG. 14 is a partial enlarged view of a multi-chip color image sensor according to the third embodiment of the present invention, and FIGS. 15A and 15B are partial enlarged views of multi-chip color image sensors according to the fourth and fifth embodiments of the present invention.

In the third embodiment, two light-receiving windows constitute one color light-receiving element. For example, in FIG. 14, light-receiving windows 31 and 32 constitute one color light-receiving element, and a last light-receiving window 33 of a semiconductor image sensor 30-1 and a first light-receiving window 34 of a semiconductor image sensor 30-2 constitute one color light-receiving element at a joint.

In the fourth embodiment, four light-receiving windows constitute one color light-receiving element. For example, in FIG. 15A, light-receiving windows 41, 42, 43, and 44 constitute one color light-receiving element, and last light-receiving windows 45 and 46 of a semiconductor image sensor 40-1 and light-receiving windows 47 and 48 of a semiconductor image sensor 40-2 constitute one color light-receiving element at a joint.

In the fifth embodiment, four light-receiving windows constitute one color light-receiving element like in the fourth embodiment. For example, in FIG. 15B, light-receiving windows 42, 43, 44, and 49 constitute one color light-receiving element, and a light-receiving window 46 of a semiconductor image sensor 40-1 and light-receiving windows 47, 48, and 41 of a semiconductor image sensor 40-2 constitute one color light-receiving element at a joint.

Note that in FIG. 14 and FIGS. 15A and 15B, $P_1$, $P_2$, and $P_6$ respectively designate a regular pitch, a pitch at a joint of adjacent semiconductor image sensors, and a distance between outer edges of the first light-receiving window and the last light-receiving window at a joint of the adjacent semiconductor image sensors like in the first and second embodiments.

FIG. 14 and FIGS. 15A and 15B do not illustrate colors of color filters of the semiconductor image sensors. The color filters may be constituted by using some or all of the above-mentioned RED, GREEN, and BLUE, or cyan, magenta, and yellow color filters.

The arrangement of the multi-chip color image sensors constituted by the semiconductor image sensors shown in FIG. 14 and FIGS. 15A and 15B are equivalent to that of the multi-chip color image sensor shown in FIG. 11. For the same reason as in the first embodiment, it is preferable in the third embodiment that the first light-receiving window of the first semiconductor image sensor, and the last light-receiving window of the last semiconductor image sensor are not used as data outputs for an image output. In the fourth embodiment, it is also preferable that the first and second light-receiving windows of the first semiconductor image sensor, and the two last light-receiving windows of the last semiconductor image sensor are not used as data outputs for an image output. In the fifth embodiment, it is preferable that the first and second light-receiving windows of the first semiconductor image sensors and the last light-receiving window of the last semiconductor image sensor are not used as data outputs for an image output.

As described in detail above, according to the multi-chip color image sensors of the above embodiments, the following effects can be obtained.

(1) The influence of a joint between adjacent semiconductor image sensors can be minimized, and a good image output can be obtained.

(2) A semiconductor image sensor which can obtain a good image output while a joint interval remains the same as that of a conventional monochrome sensor, and can be mounted without requiring a special semiconductor die-bonding device, can be provided.

The sixth embodiment of the present invention will be described below.

The sixth embodiment employs a semiconductor image sensor on which light-receiving window groups (three light-receiving windows constitute one color dot) each constituting one color dot are sequentially arranged in the main scanning direction at a resolution of 400 DPI, i e., at a 63.5-μm pitch. 316 color dots, i.e., 948 light-receiving windows are arranged on one semiconductor image sensor. The main scanning length of each light-receiving window is 15 μm, and about 6 μm are used for isolation between adjacent light-receiving windows, and wiring. In order to set a pitch of three light-receiving windows to be 63.5 μm, an isolation width of about 6 μm is locally adjusted. The main scanning length of the semiconductor image sensor chip is about 20 mm. 11 semiconductor image sensors are arranged on a circuit board, so that light-receiving windows are aligned in a line in the main scanning direction, thus allowing A4-size reading.

FIGS. 16 and 17 are schematic plan views showing the overall arrangements of multi-chip color image sensors according to the present invention.

In FIGS. 16 and 17, semiconductor image sensors 120 according to the present invention are formed on a circuit board 123. The image sensors 120 have light-receiving windows 122 arranged in a direction perpendicular to the main scanning direction, and other light-receiving windows 121. In FIGS. 16 to 26, the same reference numerals denote the corresponding parts.

FIG. 16 shows an arrangement wherein the light-receiving windows 122 are arranged on two sides of each image sensor 120, and FIG. 17 shows an arrangement wherein light-receiving windows 122 are arranged on one side of each image sensor 120. In the embodiment to be described below, a case will be explained wherein the light-receiving windows are arranged on two sides of the image sensor 120.

Figure 18:
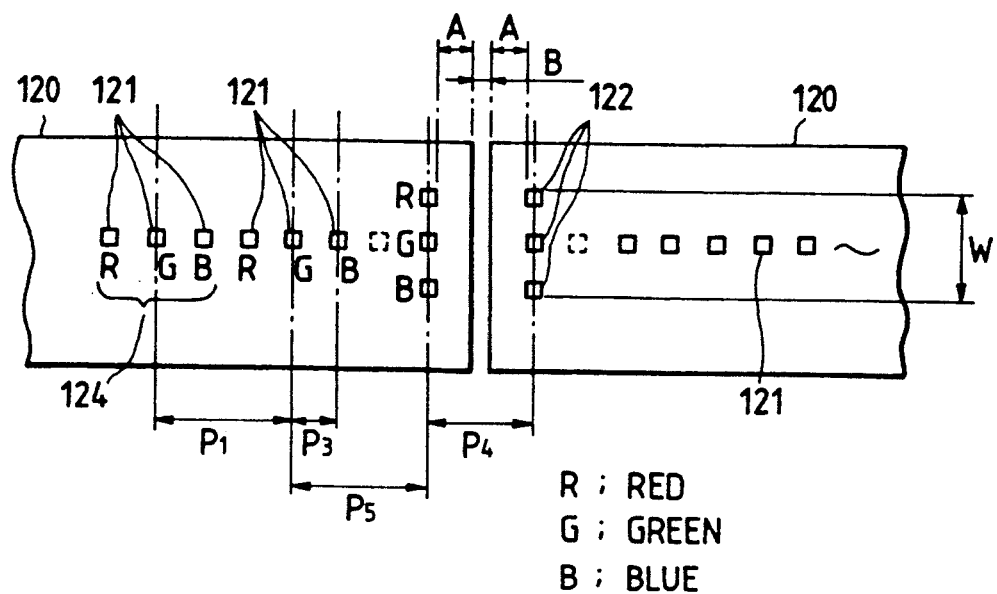
FIG. 18 is a partial enlarged view showing a multi-chip color image sensor according to the sixth embodiment of the present invention.

FIG. 18 is a partial enlarged view of a multi-chip color image sensor according to the sixth embodiment of the present invention. FIG. 18 corresponds to an enlarged view of a portion B in FIG. 16, and is an explanatory view of the characteristic feature of the present invention.

As has already been described above, a pitch $P_1$ of one color dot at 400 DPI is 63.5 μm, and three light-receiving windows 124 are sequentially arranged at this pitch to have a GREEN window as the central window.

It is preferable that three light-receiving windows 122 at each of two ends of a semiconductor image sensor 120 are arranged at a pitch of 63.5 μm from an immediately preceding GREEN light-receiving window. More specifically, it is preferable that $P_1=P_5$ ($P_5$ designates a pitch between the central position of the immediately preceding GREEN light-receiving window and the main scanning central position of the three light-receiving windows). This is to eliminate the influence on an output image caused by a pitch offset. In order to realize this, the main scanning central position of the three light-receiving windows 122 is located at a position separated by a distance twice a pitch $P_3$ from the central position of an adjacent BLUE light-receiving window.

In order to eliminate the influence on an output image caused by a pitch offset, a pitch $P_4$ at a joint between adjacent semiconductor image sensors is preferably closer to a pitch $P_1$ or $P_5$.

In this embodiment, since the three light-receiving windows 122 are juxtaposed in the subscanning direction, the pitch $P_4$ at a joint between the adjacent semiconductor image sensors can be closer to the pitch $P_1$ or $P_5$ as compared to the in-line system multi-chip image sensor shown in FIG. 8.

The concrete value of the pitch $P_4$ will be calculated below.

Assuming that a distance A from the edge of the three light-receiving windows 122 to the edge of the semiconductor image sensor is set to be 20 μm (a value determined in consideration of dicing precision and the influence on the light-receiving windows), and the interval B at the joint between the adjacent semiconductor image sensors is set to be 20 μm (a value determined based on die-bonding precision), we have:

$$P_4 = \frac{15}{2} + \frac{15}{2} + 2 \times A + B = 75 \; (\mu m)$$

A ratio of $P_4$ to $P_1$ (or $P_5$) is calculated by:

$$P_4/P_1 = 75/63.5 = 1.18$$

That is, a pitch offset is 1.18 times the regular pitch, and is a value which almost does not cause a problem on image quality.

Furthermore, a distance W between the outer edge of the first light-receiving window (RED in FIG. 18) and the outer edge of the third light-receiving window (BLUE in FIG. 18) of the light-receiving windows 122 arranged in a direction perpendicular to the main scanning direction is set to be three times or less times a pitch $P_3$ of the light-receiving windows 121, i.e., to be 63.5 μm or less. More specifically, since the distance W is set to be smaller than the width of one color dot at 400 DPI, the read position of the three light-receiving windows is almost equivalent to a case wherein an identical point of an original is read.

In the embodiment described above, RED, GREEN, and BLUE color filters have been exemplified. However, other color filters, e.g., cyan, magenta, and yellow color filters may be employed.

Figure 19A:
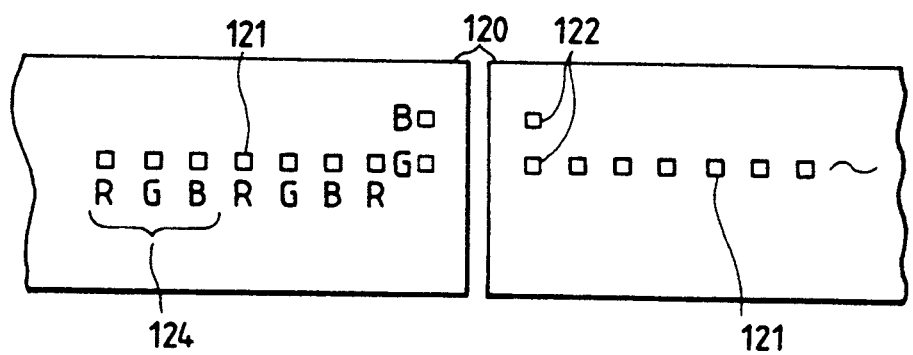
FIGS. 19A and 19B are partial enlarged views of multi-chip color image sensors according to the seventh and eighth embodiments of the present invention.
Figure 19B:
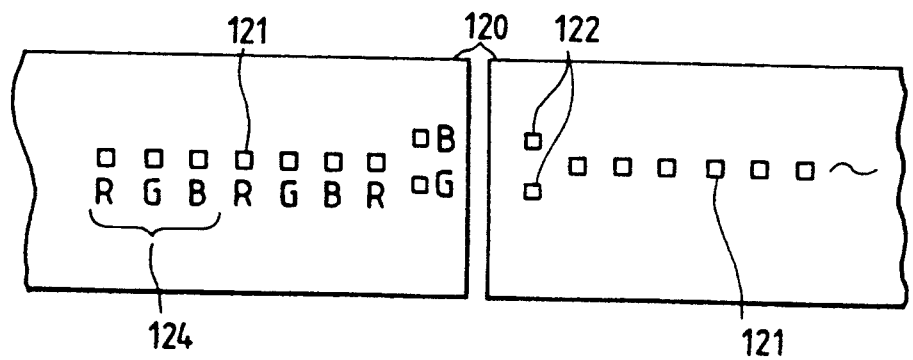

FIGS. 19A and 19B are partial enlarged views of multi-chip color image sensors according to the seventh and eighth embodiments of the present invention.

In these (seventh and eighth) embodiments, the number of light-receiving windows juxtaposed in the subscanning direction on an end portion of a semiconductor image sensor is two.

In the seventh embodiment shown in FIG. 19A, a light-receiving window of a color filter B is arranged above (in the plane of paper of FIG. 19A) a light-receiving window of a color filter G arranged in the same manner as other light-receiving windows. These two light-receiving windows are light-receiving windows "juxtaposed in the subscanning direction" of the present invention. These two light-receiving windows and a light-receiving window of an adjacent color filter R constitute one color light-receiving element.

In this embodiment, a distance between the central position of the light-receiving window of the adjacent color filter R and the central position of the light-receiving window of the color filter G is equal to a pitch $P_3$ of other light-receiving windows.

In the eighth embodiment shown in FIG. 19B, a middle position between light-receiving windows of color filters G and B coincides with the center of other light-receiving windows aligned in the main scanning direction.

Figure 20A:
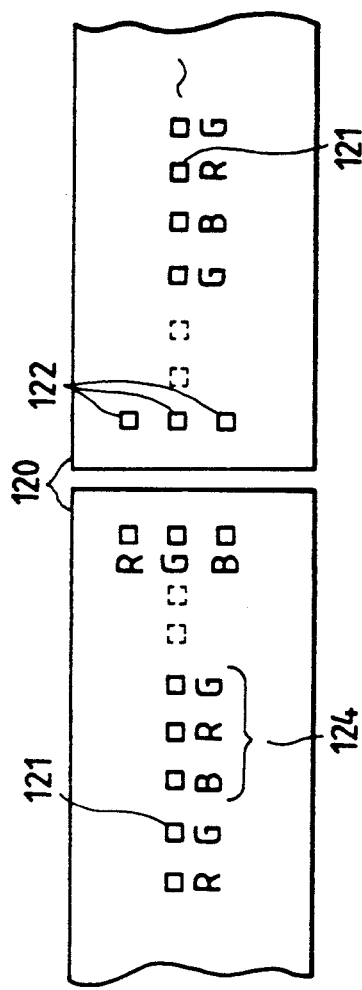
FIGS. 20A and 20B are partial enlarged views of multi-chip color image sensors according to the ninth and 10th embodiments of the present invention.
Figure 20B:
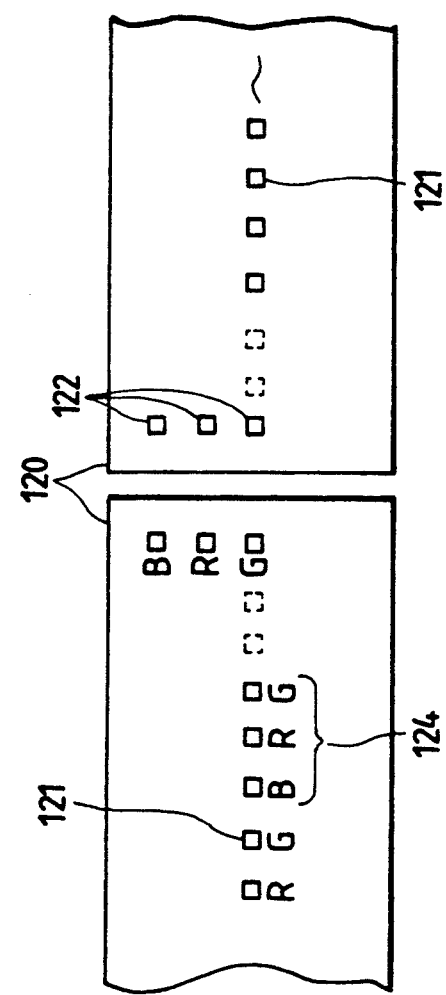

FIGS. 20A and 20B are partial enlarged views of multi-chip color image sensors according to the ninth and 10th embodiments of the present invention.

In the ninth embodiment shown in FIG. 20A, light-receiving windows of color filters R and B are arranged on two sides of a light-receiving window of a color filter G arranged in the same manner as other light-receiving windows. These three light-receiving windows are light-receiving windows "juxtaposed in the subscanning direction" of the present invention.

In this embodiment, a distance between the central position of the light-receiving window of the adjacent color filter G and the central position of the light-receiving window of the color filter G juxtaposed in the subscanning direction is three times a pitch $P_3$ of other light-receiving windows.

In the 10th embodiment shown in FIG. 20B, light-receiving windows of two color filters R and B are arranged above (FIG. 20B) a light-receiving window of a color filter G arranged in the same manner as other light-receiving filters.

In the above embodiments, the number of colors is three, i.e., R, G, and B. However, the present invention may be applied to two colors or four or more colors. Such embodiments will be explained below.

FIGS. 21A and 21B are partial enlarged views of multi-chip color image sensors according to the 11th and 12th embodiments of the present invention.

FIGS. 22A and 22B are partial enlarged views of multi-chip color image sensors according to the 13th and 14th embodiments of the present invention.

In each of the embodiments shown in FIGS. 21A and 21B, and FIGS. 22A and 22B, the number of light-receiving windows juxtaposed in the subscanning direction on an end portion of a semiconductor image sensor is two. Light-receiving windows of two color filters R and B constitute one color light-receiving element.

In FIGS. 21A and 21B, and FIGS. 22A and 22B, light-receiving windows 125 constitute one color light-receiving element. In the 11th embodiment shown in FIG. 21A, a light-receiving window of a color filter R is arranged above (FIG. 21A) a light-receiving window of a color filter G arranged in the same manner as other light-receiving windows. These two light-receiving windows are light-receiving windows "juxtaposed in the subscanning direction" of the present invention.

In this embodiment, a distance between the central position of the light-receiving window of the adjacent color filter G and the central position of the light-receiving window of the color filter G as one of the light-receiving windows juxtaposed in the subscanning direction is equal to a pitch $P_3$ of other light-receiving windows.

In the 12th embodiment shown in FIG. 21B, a middle position between light-receiving windows of color filters G and R coincides with the center of other light-receiving windows aligned in the main scanning direction.

In the 13th embodiment shown in FIG. 22A, a distance between the central position of a light-receiving window of an adjacent color filter G and the central position of a light-receiving window of a color filter G as one of light-receiving windows juxtaposed in the subscanning direction is set to be twice a pitch $P_3$ of other light-receiving windows as compared to the 11th embodiment shown in FIG. 21A.

In the 14th embodiment shown in FIG. 22B, a distance between the central position of a light-receiving window of an adjacent color filter G and a middle position between light-receiving windows of color filters G and R is set to be twice a pitch $P_3$ of other light-receiving windows as compared to the 12th embodiment shown in FIG. 21B.

Figure 23A:
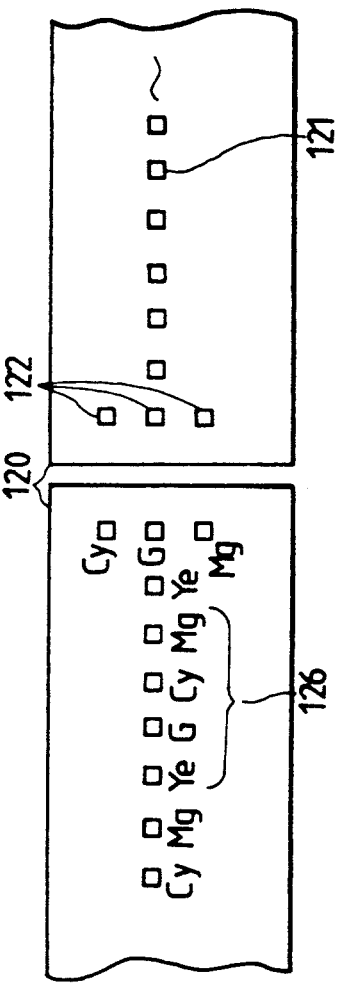
FIGS. 23A and 23B are partial enlarged views of multi-chip color image sensors according to the 15th and 16th embodiments of the present invention.
Figure 23B:
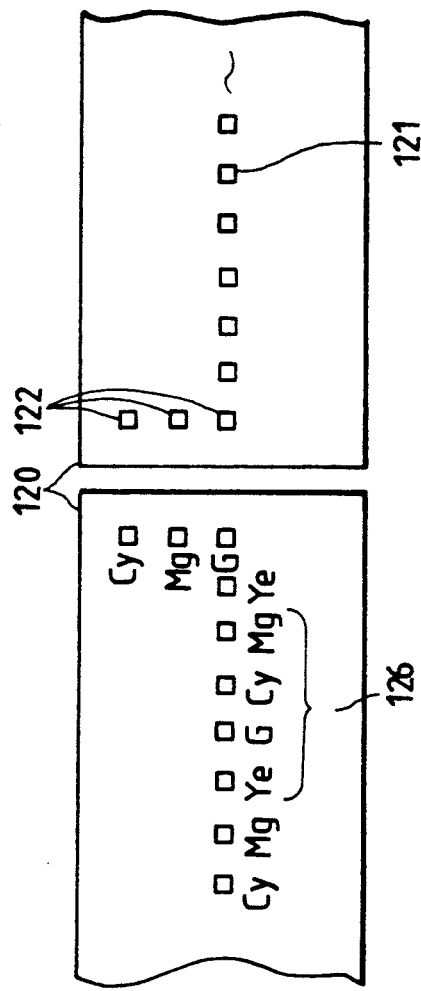

FIGS. 23A and 23B are partial enlarged views of multi-chip color image sensors according to the 15th and 16th embodiments of the present invention.

FIGS. 24A and 24B are partial enlarged views of multi-chip color image sensors according to the 17th and 18th embodiments of the present invention.

Figure 25A:
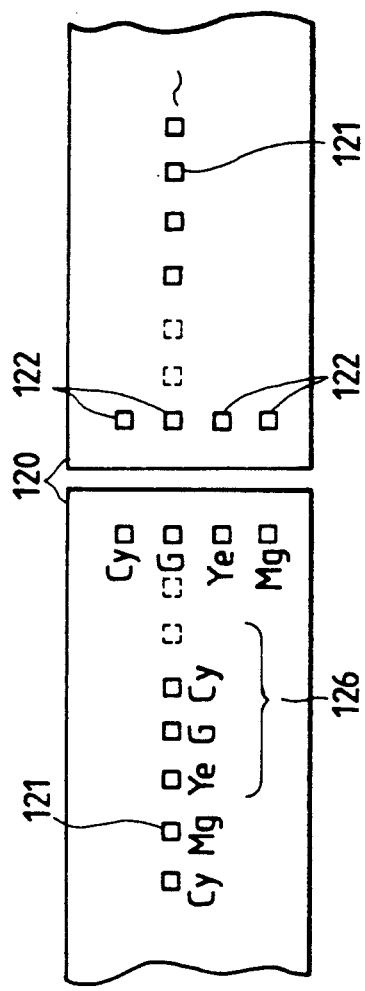
FIGS. 25A and 25B are partial enlarged views of multi-chip color image sensors according to the 19th and 20th embodiments of the present invention.
Figure 25B:
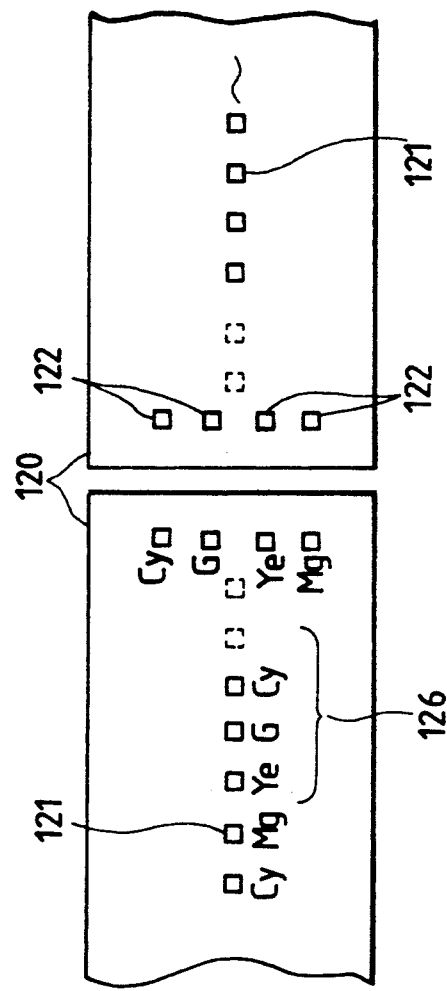

FIGS. 25A and 25B are partial enlarged views of multi-chip color image sensors according to the 19th and 20th embodiments of the present invention.

Figure 26A:
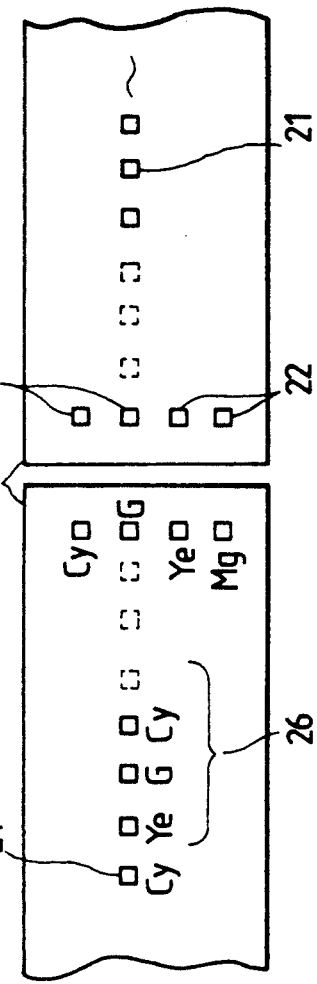
FIGS. 26A and 26B are partial enlarged views of multi-chip color image sensors according to the 21st and 22nd embodiments of the present invention.
Figure 26B:
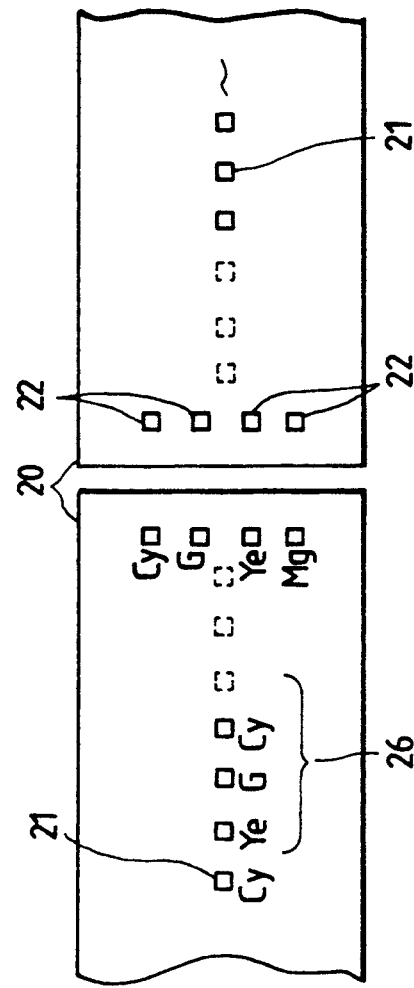

FIGS. 26A and 26B are partial enlarged views of multi-chip color image sensors according to the 21st and 22nd embodiments of the present invention.

In each of the embodiments shown in FIGS. 23A and 23B, the number of light-receiving windows juxtaposed in the subscanning direction on an end portion of a semiconductor image sensor is three. These three light-receiving windows and a light-receiving window of an adjacent color filter constitute one color light-receiving element.

In each of the embodiments shown in FIGS. 24A to 26B, the number of light-receiving windows juxtaposed in the subscanning direction on an end portion of a semiconductor image sensor is four. These four light-receiving windows constitute one color light-receiving element.

In FIGS. 23A to 26B, light-receiving windows 126 constitute one color light-receiving element.

In the 15th embodiment shown in FIG. 23A, light-receiving windows of color filters Cy and Mg are arranged on two sides of a light-receiving window of a color filter G arranged in the same manner as other light-receiving windows. These three light-receiving windows are light-receiving windows "juxtaposed in the subscanning direction" of the present invention. These three light-receiving windows and a light-receiving window of an adjacent color filter Ye constitute one color light-receiving element.

In this embodiment, a distance between the central position of the light-receiving window of the adjacent color filter Ye and the central position of the light-receiving window of the color filter G as one of light-receiving windows juxtaposed in the subscanning direction is equal to a pitch $P_3$ of other light-receiving windows.

In the 16th embodiment shown in FIG. 23B, light-receiving windows of color filters Cy and Mg are arranged above (FIG. 23B) a light-receiving window of a color filter G.

In the 17th embodiment shown in FIG. 24A, a light-receiving window of a color filter Ye is arranged above (FIG. 24A) a light-receiving window of a color filter G arranged in the same manner as other light-receiving windows, and light-receiving windows of color filters Cy and Mg are arranged below (FIG. 24A) the light-receiving window of the color filter G. These four light-receiving windows are light-receiving windows "juxtaposed in the subscanning direction" of the present invention.

In this embodiment, a distance between the central position of a light-receiving window of an adjacent color filter Mg and the central position of the light-receiving window of the color filter G as one of light-receiving windows juxtaposed in the subscanning direction is set to be twice a pitch $P_3$ of other light-receiving windows.

In the 18th embodiment shown in FIG. 24B, a middle position between light-receiving windows of color filters Ye and G and light-receiving windows of color filters Cy and Mg coincides with the center of other light-receiving windows aligned in the main scanning direction.

In the 19th embodiment shown in FIG. 25A, a light-receiving window of a color filter Cy is arranged above (FIG. 25A) a light-receiving window of a color filter G arranged in the same manner as other light-receiving windows, and light-receiving windows of color filters Ye and Mg are arranged below (FIG. 25A) the light-receiving window of the color filter G. These four light-receiving windows are light-receiving windows "juxtaposed in the subscanning direction" of the present invention.

In this embodiment, a distance between the central position of a light-receiving window of an adjacent color filter Cy and the central position of the light-receiving window of the color filter G as one of the light-receiving windows juxtaposed in the subscanning direction is set to be three times a pitch $P_3$ of other light-receiving windows.

In the 20th embodiment shown in FIG. 25B, a middle position between light-receiving windows of color filters Cy and G, and light-receiving windows of color filters Ye and Mg coincides with the center of other light-receiving windows aligned in the main scanning direction.

In the 21st embodiment shown in FIG. 26A, a distance between the central position of a light-receiving window of an adjacent color filter Cy and the central position of a light-receiving window of a color filter G as one of light-receiving windows juxtaposed in the subscanning direction is set to be four times a pitch $P_3$ of other light-receiving windows as compared to the 19th embodiment shown in FIG. 25A.

In the 22nd embodiment shown in FIG. 26B, a distance between the central position of a light-receiving window of an adjacent color filter Cy and a middle position between light-receiving windows of color filters Cy and G, and light-receiving windows of color filters Ye and Mg is set to be four times a pitch $P_3$ of other light-receiving windows as compared to the 20th embodiment shown in FIG. 25B.

As described in detail above, according to the multi-chip color image sensors of the sixth to 22nd embodiments of the present invention, the following effects can be obtained.

(1) A pitch corresponding to one color dot at a joint between adjacent semiconductor image sensors can be closer to a regular pitch, and the influence of an image of the joint on an output image can be minimized.

(2) An interval of a joint between adjacent semiconductor image sensors (a gap between adjacent semiconductor image sensors) can remain the same as that of a conventional monochrome sensor, and a required mounting precision can be attained by a conventional die-bonding device.

(3) As compared to the 3-line system, external components such as memories are unnecessary, and a system can become simple.

(4) Since the number of chips can be reduced to ⅓ as compared to the third system of the prior art (a system having three lines of chips), cost can be reduced, and an assembling time can be shortened.

Figure 27A:
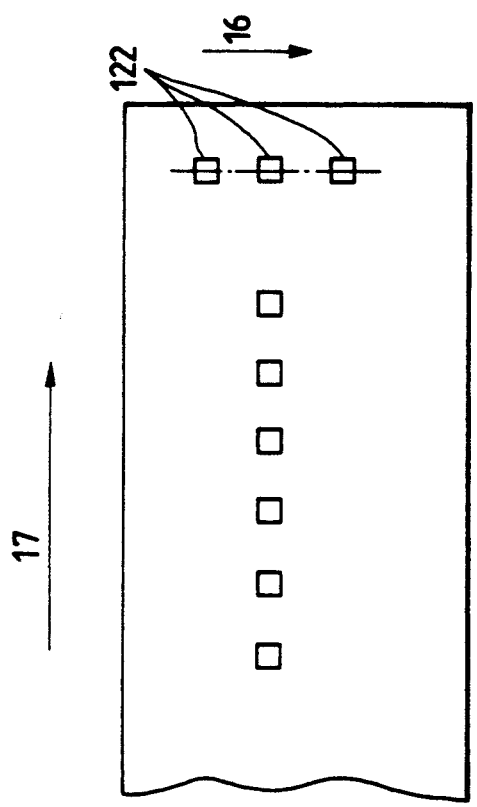
FIGS. 27A and 27B are partial enlarged views of multi-chip color image sensors for explaining the present invention.
Figure 27B:
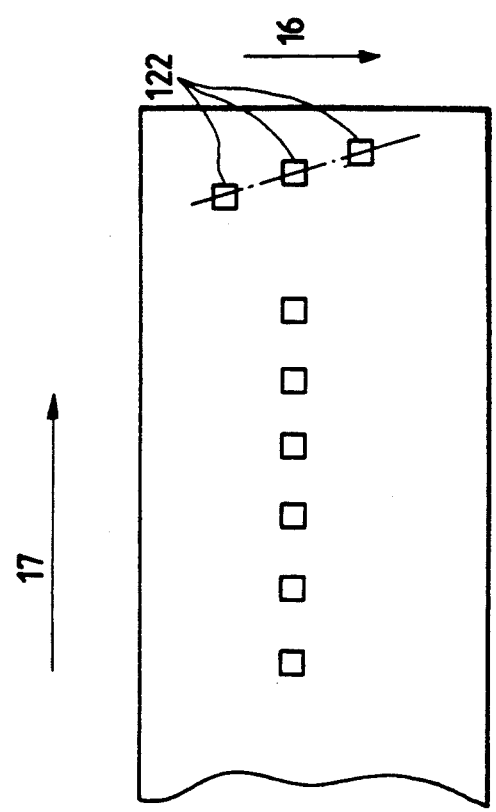

In the above embodiments, the description "juxtaposed in the subscanning direction" is not limited to a case wherein, as shown in FIG. 27A, a plurality of (three in FIG. 27A for the sake of simplicity) light-receiving windows 122 are arranged in a direction perpendicular to the main scanning direction (parallel to the subscanning direction 16), but also includes a case wherein the plurality of light-receiving windows 122 are arranged to be not parallel to the subscanning direction 16, as shown in FIG. 27B. In FIGS. 27A and 27B, the plurality of light-receiving windows 122 are aligned in a line. However, the present invention includes a case wherein they are arranged not in a line.

Other embodiments of the present invention will be described in detail below with reference to the accompanying drawings.

Figure 28A:
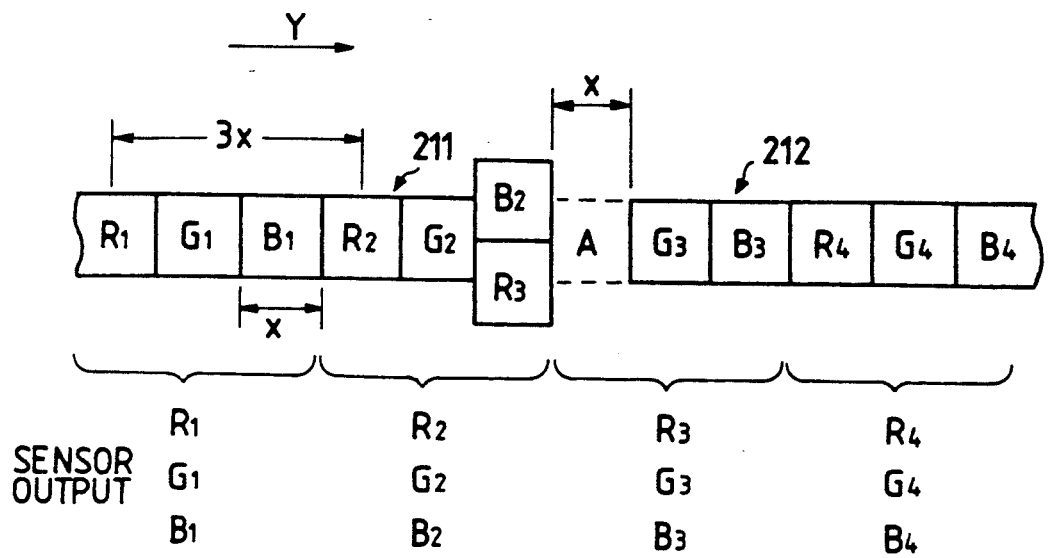
FIGS. 28A and 28B are explanatory views showing arrangements of pixels of semiconductor sensor chips in a color photoelectric conversion apparatus according to the 23rd embodiment of the present invention.
Figure 28B:
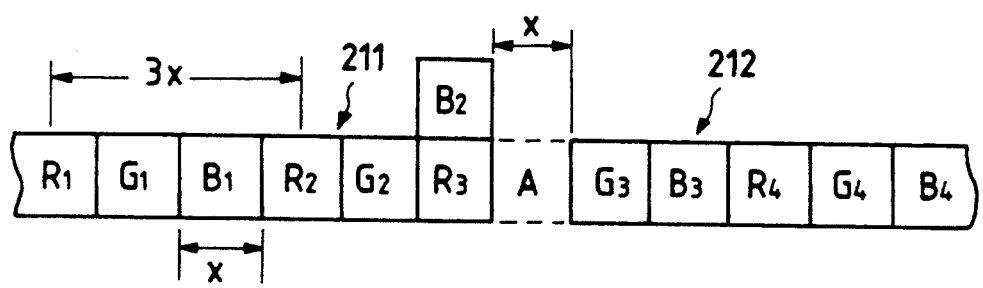

FIGS. 28A and 28B are explanatory views showing an arrangement of pixels of semiconductor sensor ships of a color photoelectric conversion apparatus according to the 23rd embodiment of the present invention.

Note that the arrangement of the semiconductor sensor chips is the same as that shown in FIG. 11.

The same reference numerals in FIGS. 28A to 34B denote the same parts.

As shown in FIGS. 28A and 28B, a nonsensitive region A without pixels is present between adjacent semiconductor sensor chips 211 and 212. In this case, the nonsensitive region A corresponds to a pixel pitch (pitch of color filters) x.

In this embodiment, a pixel $R_3$ as a pixel corresponding to the nonsensitive region A is arranged in a direction (subscanning direction; the subscanning direction corresponds to a feed direction of an original to be read) perpendicular to an array direction of pixels (main scanning direction; a Y direction in FIG. 28A) on an end portion of a pixel array of the semiconductor sensor chip 211. A pixel $B_3$ and the pixel $R_3$ are juxtaposed in a direction perpendicular to the array direction (main scanning direction; the Y direction in FIG. 28A) of the pixels.

In FIG. 28A, a middle position between the pixels $B_2$ and $R_3$ coincides with the center of other pixels aligned in the main scanning direction. However, in FIG. 28B, the pixel $R_3$ is arranged in the same manner as other pixels aligned in the main scanning direction, and the pixel $B_2$ is arranged above (FIG. 28B) the pixel $R_3$ (or may be arranged below (FIG. 28B) the pixel $R_3$).

Since a pixel pitch in units of primary colors (e.g., between $R_1$ and $R_2$) is three times (3x) the length x of the nonsensitive region A, even if an image sampling position of the pixel $R_3$ is offset by the distance x, its influence is small. In order to further eliminate this influence, an optical filter for causing an optical path offset of 3x/2 can be arranged on the sensor.

The color filters are preferably arranged as follows. That is, as shown in FIGS. 28A and 28B, color filters B and R are arranged in a direction parallel to the array direction of the sensor chips while placing an importance on continuity of color signals G among the chips. This is because a ratio of G in normal image data is very high.

When the color photoelectric conversion apparatus of this embodiment is used in a black-and-white mode, G outputs can be utilized to eliminate the influence of the nonsensitive regions since their arrangement is left unchanged. Thus, image degradation will not occur.

Figure 29:
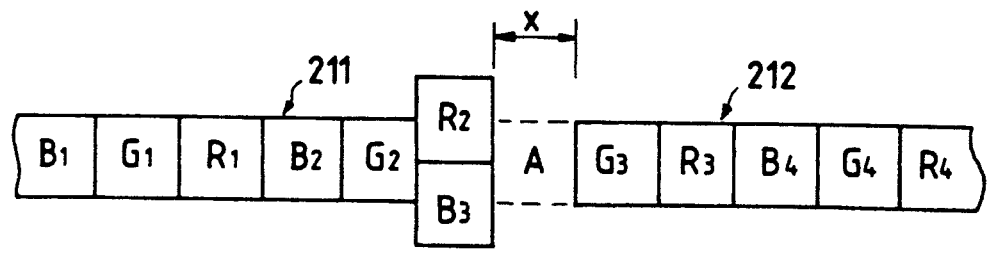
FIG. 29 is an explanatory view showing an arrangement of pixels of semiconductor sensor chips in a color photoelectric conversion apparatus according to the 24th embodiment of the present invention.

FIG. 29 is an explanatory view showing an arrangement of pixels of semiconductor sensor chips in a color photoelectric conversion apparatus according to the 24th embodiment of the present invention.

A difference between this embodiment and the color photoelectric conversion apparatus shown in FIGS. 28A and 28B is that the positions of color filters B and R are replaced. When discontinuity of pixels occurs, a pixel B which has the smallest influence is used for a nonsensitive region.

An arrangement and operation of a signal read circuit of the color photoelectric conversion apparatus will be described below.

Figure 30:
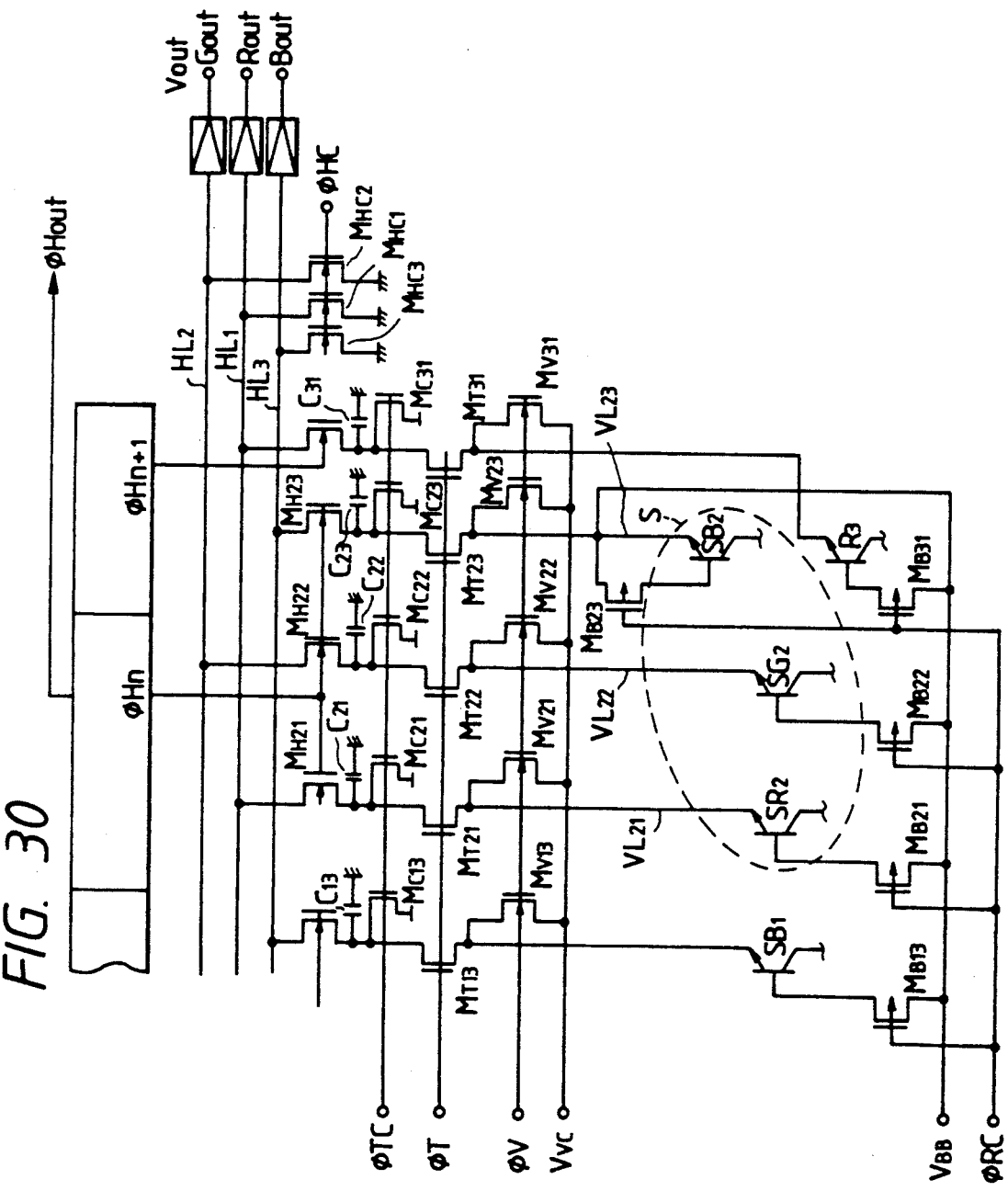
FIG. 30 is a circuit diagram of a signal read circuit of the color photoelectric conversion apparatus.

FIG. 30 is a circuit diagram of the signal read circuit of the color photoelectric conversion apparatus.

Figure 31:
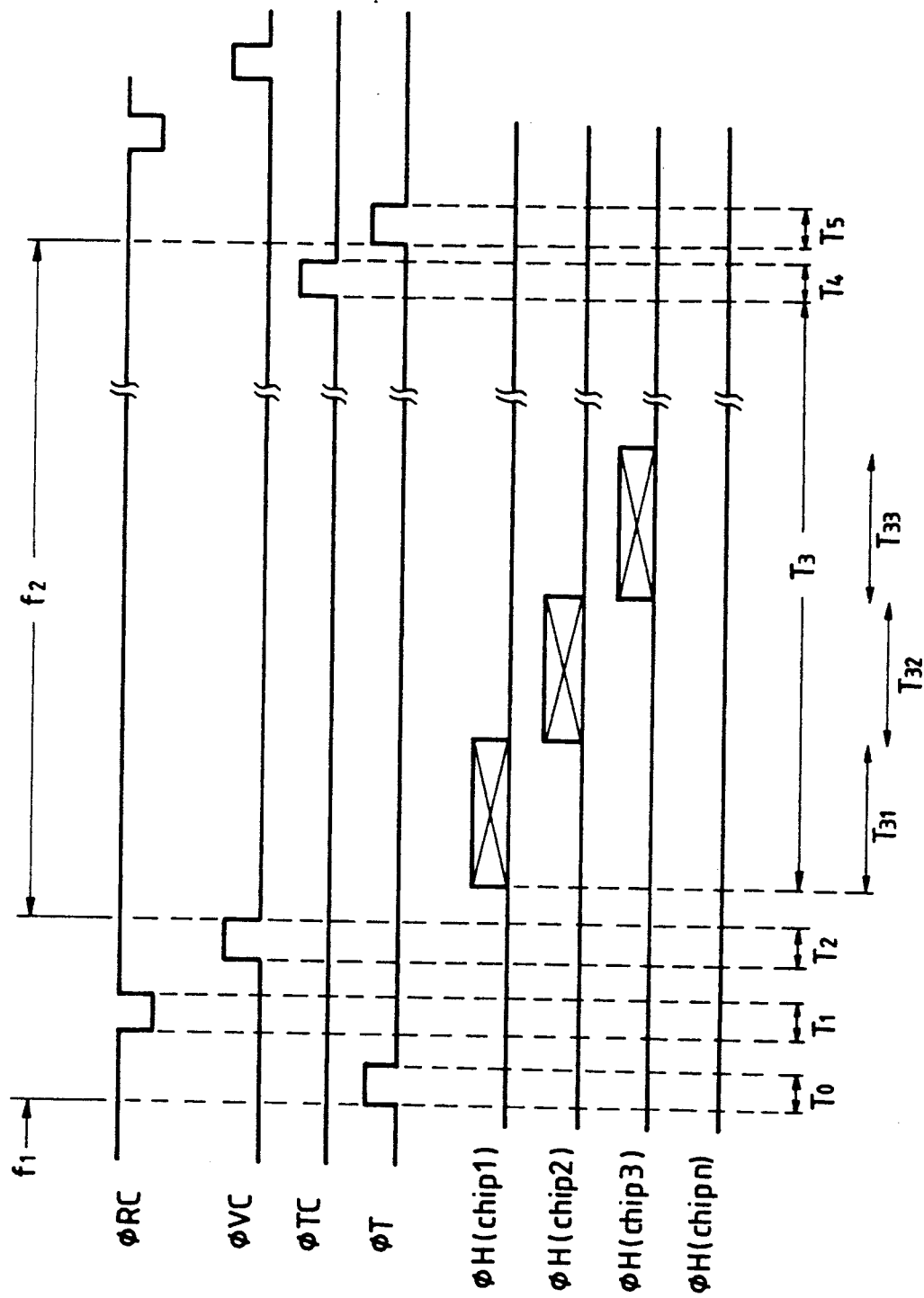
FIG. 31 is a timing chart for explaining an operation of the signal read circuit.

FIG. 31 is a timing chart for explaining the operation of the signal read circuit.

As shown in FIG. 30, a photoelectric conversion sensor is a bipolar sensor, and one color light-receiving element S is constituted by sensors $SR_2$, $SG_2$, and $SB_2$, as enclosed in a broken circle. Note that two pixels are juxtaposed on the end portion of the pixel array of each semiconductor sensor chip like in the 23rd embodiment shown in FIG. 28A. For the sake of simplicity, only an arrangement of a signal read circuit portion associated with the sensors $SR_2$, $SG_2$, and $SB_2$ will be described below.

Light charges corresponding light beams passing through color filters R, G, and B are accumulated on the base regions of the sensors $SR_2$, $SG_2$, and $SB_2$, respectively. Signal charges amplified in correspondence with the light charges are respectively accumulated on capacitors $C_{21}$, $C_{22}$, and $C_{23}$ from the emitters of the sensors SR$_2$, SG$_2$, and SB$_2$ via MOS transistors M$_{T21}$, M$_{T22}$, and M$_{T23}$. The signals transferred to the capacitors C$_{21}$, C$_{22}$, and C$_{23}$ are transferred to horizontal output lines HL$_1$, HL$_2$, and HL$_3$ via MOS transistors M$_{H21}$, M$_{H22}$, and M$_{H23}$ which are controlled by a pulse $\phi_{Hn}$ from a scanning circuit, and are then simultaneously output as output signals R$_{out}$, G$_{out}$, and B$_{out}$ corresponding to three pixels R, G, and B.

PMOS transistors M$_{B21}$, M$_{B22}$, and M$_{B23}$ reset the bases of the sensors SR$_2$, SG$_2$, and SB$_2$ to a potential V$_{BB}$, respectively, and are controlled by a pulse $\phi_{RC}$. MOS transistors M$_{V21}$, M$_{V22}$, and M$_{V23}$ reset vertical output lines VL$_{21}$, VL$_{22}$, and VL$_{23}$ to a potential V$_{VC}$, respectively, and are controlled by a pulse $\phi_{VC}$. MOS transistors M$_{C21}$, M$_{C22}$, and M$_{C23}$ reset the capacitors C$_{21}$, C$_{22}$, and C$_{23}$ to a predetermined potential (GND in this case), respectively, and are controlled by a pulse $\phi_{TC}$. MOS transistors M$_{HC21}$, M$_{HC22}$, and M$_{HC23}$ reset the horizontal output lines HL$_1$, HL$_2$, and HL$_3$ to a predetermined potential (GND in this case), respectively, and are controlled by a pulse $\phi_{HC}$.

Note that an output from the pixel R$_3$ is output simultaneously with outputs from pixels G$_3$ and B$_3$ of the next semiconductor sensor chip. More specifically, after output signals G$_{out}$, R$_{out}$, and B$_{out}$ of three pixels G, R, and B are output, an output from the interpolation pixel R$_3$ is transferred onto an output signal line in response to a pulse $\phi_{Hn+1}$ from the scanning circuit. Simultaneously, outputs from the pixels G$_3$ and B$_3$ of the next semiconductor sensor chip are output. In order to drive the scanning circuit for the next semiconductor sensor chip in synchronism with the pulse $\phi_{Hn+1}$, the scanning circuit for the next semiconductor sensor chip can be enabled by a pulse output before the pulse $\phi_{Nh+1}$, e.g., a pulse $\phi_{out}$ shown in FIG. 30.

The operation of the signal read circuit will be described below with reference to FIG. 31.

Note that for the sake of simplicity, only an operation of the signal read circuit portion associated with the sensors SR$_2$, SG$_2$, and SB$_2$ will be described below.

In FIG. 31, a pulse $\phi_T$ is set at HIGH level during a period T$_0$, thereby accumulating the outputs from the sensors on the corresponding capacitors C$_{21}$ to C$_{23}$, and the like. The next period T$_1$ is a period for resetting the bases of the sensors as photoelectric conversion units. That is, when the pulse $\phi_{RC}$ goes from HIGH level to LOW level, the PMOS transistors M$_{B21}$, M$_{B22}$, and M$_{B23}$ are enabled, and reset the bases of the sensors SR$_2$, SG$_2$, and SB$_2$, respectively.

A period T$_2$ corresponds to a transient refresh period of the sensors. That is, when the pulse $\phi_{VC}$ goes from LOW level to HIGH level, the MOS transistors M$_{V21}$, M$_{V22}$, and M$_{V23}$ are enabled, and reset the vertical output lines VL$_{21}$, VL$_{22}$, and VL$_{23}$ to the potential V$_{VC}$, respectively. In addition, the emitters of the sensors are reset to the potential V$_{VC}$. At this time, the charges left in the bases are discharged to the emitters (this process is called "transient refresh").

A period T$_3$ corresponds to a period for outputting signals accumulated during a period f$_1$. That is, the signals accumulated on the capacitors of the semiconductor chips arranged as shown in FIG. 28A are output. The capacitors temporarily store the signals accumulated during the period f$_1$. Periods T$_{31}$, T$_{32}$, and T$_{33}$, ... in the period T$_3$ correspond to periods for outputting signals from semiconductor sensor chips 2-1, 2-2, 2-3, ..., respectively.

A period T$_4$ corresponds to a period for clearing residual charges on the capacitors. That is, when the pulse $\phi_{TC}$ goes from LOW level to HIGH level, the MOS transistors M$_{C21}$, M$_{C22}$, and M$_{C23}$ are enabled, and the residual charges on the capacitors C$_{21}$, C$_{22}$, and C$_{23}$ are cleared.

A period T$_5$ corresponds to a period for charge-amplifying signals of the photoelectric conversion units of each semiconductor sensor chip, which signals are accumulated during a period f$_2$, and transferring the amplified signals to the capacitors.

In the embodiment described above, the nonsensitive region A corresponds to the pixel pitch (pitch of color filters) x. When the nonsensitive region A is larger than the pitch x, three or more pixels are juxtaposed in a direction perpendicular to the main scanning direction, and output signals from other ones of three or more juxtaposed pixels, excluding one pixel, can be used as output signals from a region corresponding to the joint between adjacent color photoelectric transducers. For example, when the length of the nonsensitive region A is 2x, three pixels are juxtaposed in a direction perpendicular to the main scanning direction, and output signals from two pixels can be used as output signals from a region corresponding to a joint between adjacent color photoelectric transducers.

Figure 32A:
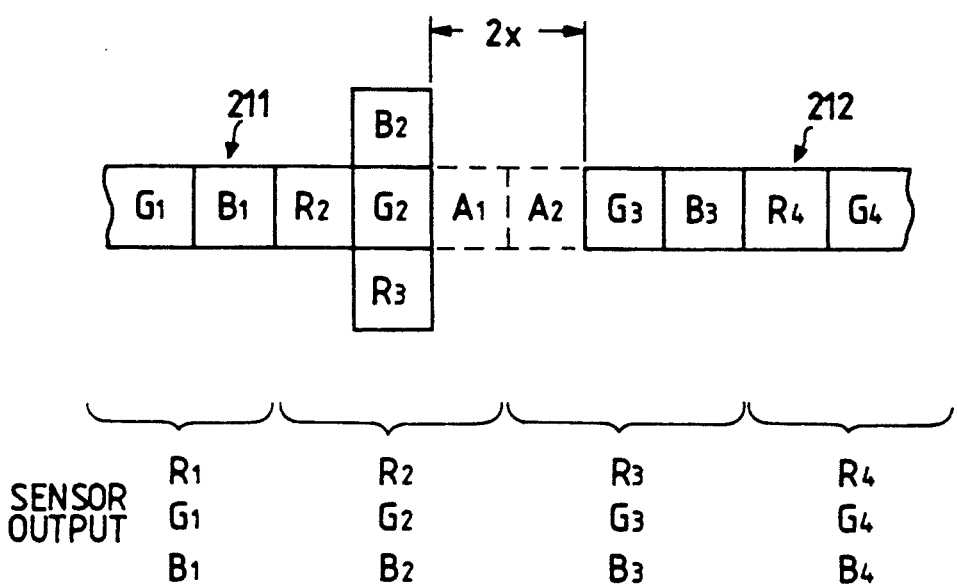
FIGS. 32A and 32B are explanatory views showing arrangements of pixels of semiconductor sensor chips of color photoelectric conversion apparatuses according to the 25th and 26th embodiments of the present invention.
Figure 32B:
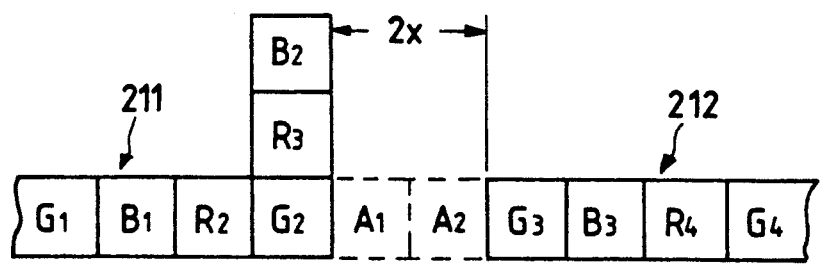

FIGS. 32A and 32B are explanatory views showing arrangements of pixels of semiconductor sensor chips in a color photoelectric conversion apparatus according to the 25th and 26th embodiments of the present invention.

These embodiments exemplify arrangements of pixels when the length of the nonsensitive region A is 2x.

FIG. 32A shows a case wherein pixels B$_2$ and R$_3$ are respectively arranged on two sides of a pixel G$_2$, and FIG. 32B shows a case wherein pixels B$_2$ and R$_3$ are arranged above a pixel G$_2$ (or may be arranged below the pixel G$_2$).

In the above embodiments, the number of colors is three, i.e., R, G, and B. However, the present invention may be applied to two colors or four or more colors.

Figure 33A:
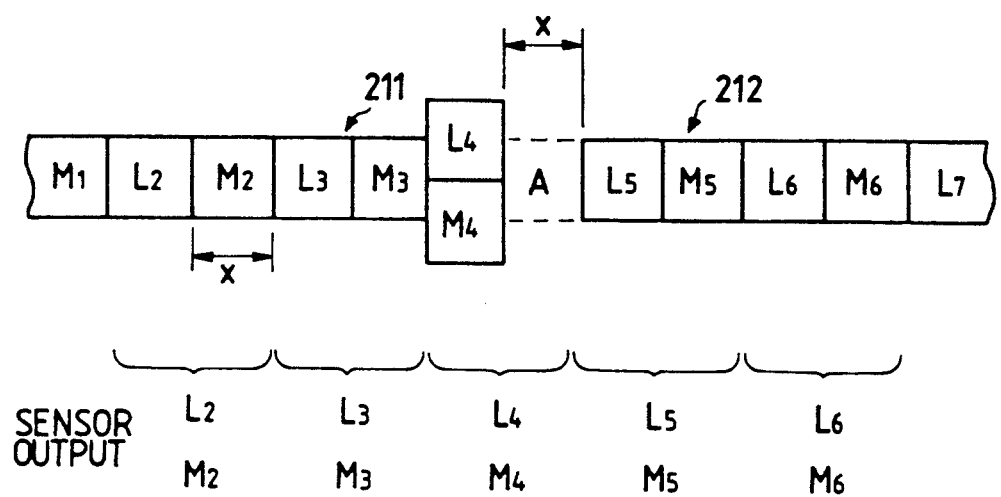
FIGS. 33A and 33B are explanatory views showing arrangements of pixels of semiconductor sensor chips of color photoelectric conversion apparatuses according to the 27th and 28th embodiments of the present invention.
Figure 33B:
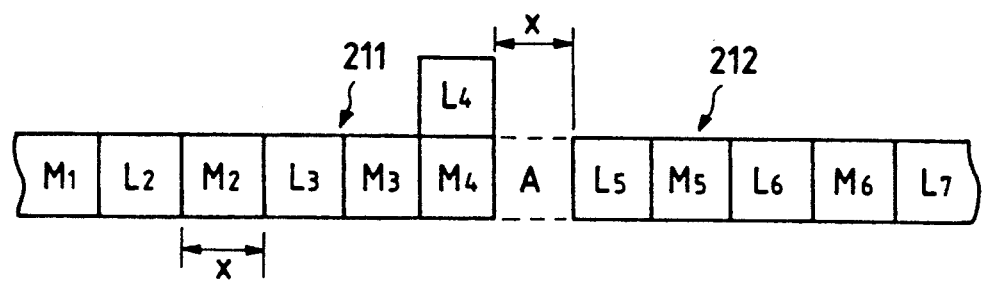

FIGS. 33A and 33B are explanatory views showing arrangements of pixels of semiconductor sensor chips in a color photoelectric conversion apparatus according to the 27th and 28th embodiments of the present invention.

These embodiment exemplify arrangements of pixels when the number of colors is two.

In these embodiments, two colors are represented by L and M.

In FIG. 33A, a middle position between pixels L$_4$ and M$_4$ coincides with the center of other pixels aligned in the main scanning direction. In FIG. 33B, a pixel M$_4$ is arranged in the same manner as other pixels aligned in the main scanning direction, and a pixel L$_4$ is arranged above a pixel M$_4$ (or may be arranged below the pixel M$_4$).

Figure 34A:
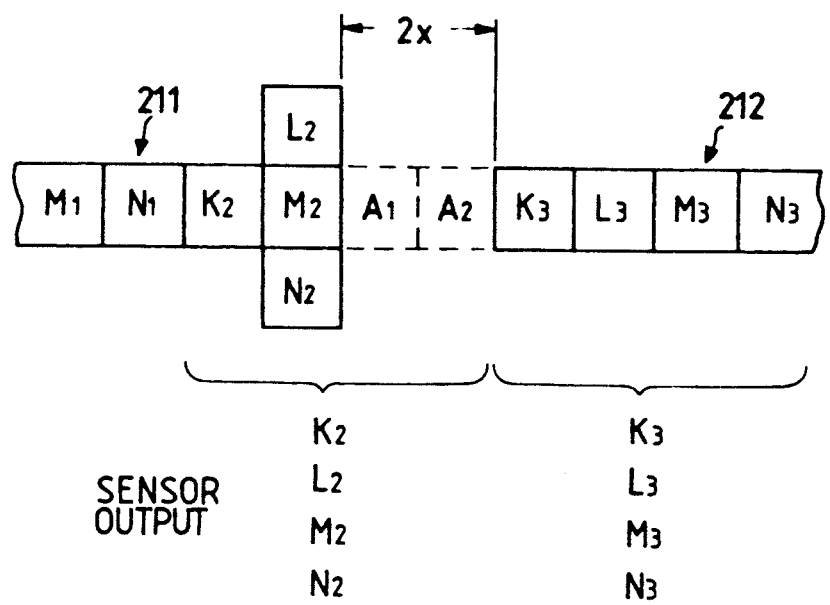
FIGS. 34A and 34B are explanatory views showing arrangements of pixels of semiconductor sensor chips of color photoelectric conversion apparatuses according to the 29th and 30th embodiments of the present invention.
Figure 34B:
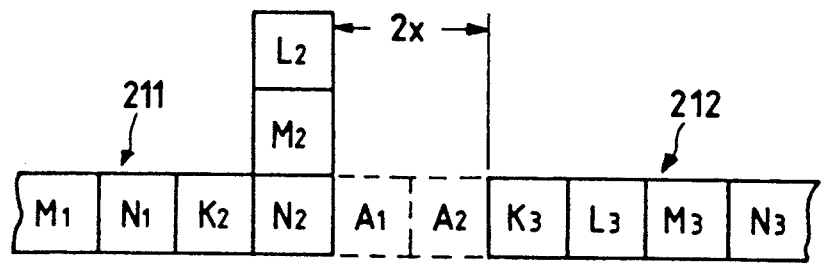

FIGS. 34A and 34B are explanatory views showing arrangements of pixels of semiconductor sensor chips in a color photoelectric conversion apparatus according to the 29th and 30th embodiments of the present invention.

These embodiments exemplify arrangements when the number of colors is four.

In these embodiments, four colors are represented by K, L, M and N.

FIG. 34A shows a case wherein pixels L$_2$ and N$_2$ of two out of four colors are arranged on two sides of a pixel M$_2$. FIG. 34B shows a case wherein pixels L$_2$ and N$_2$ are arranged above a pixel M$_2$ (or may be arranged below the pixel M$_2$).

In the embodiments described above, a plurality of pixels are juxtaposed on an end of one chip in a direction perpendicular to the main scanning direction. A plurality of pixels may also be juxtaposed on the other end portion of the chip in a direction perpendicular to the main scanning direction to further increase a distance between adjacent chips.

As described in detail above, according to the color photoelectric conversion apparatuses of the 23rd to 30th embodiments, two or more pixels are juxtaposed in a direction perpendicular to the main scanning direction on an end portion of a pixel array, aligned in the main scanning direction, of one of adjacent color photoelectric transducers, and an output signals from at least one of two or more juxtaposed pixels is used as an output signal from a region corresponding to a joint between the adjacent color photoelectric transducers, so that moire generated in the region corresponding to the joint between the adjacent color photoelectric transducers can be eliminated. According to the present invention, since pixels are aligned in a line in the main scanning direction, and need not employ a staggered arrangement, no special memory is required.

Therefore, an inexpensive color photoelectric conversion apparatus having excellent performance can be provided.

Other embodiments of the present invention will be described below with reference to the accompanying drawings.

Figure 35:
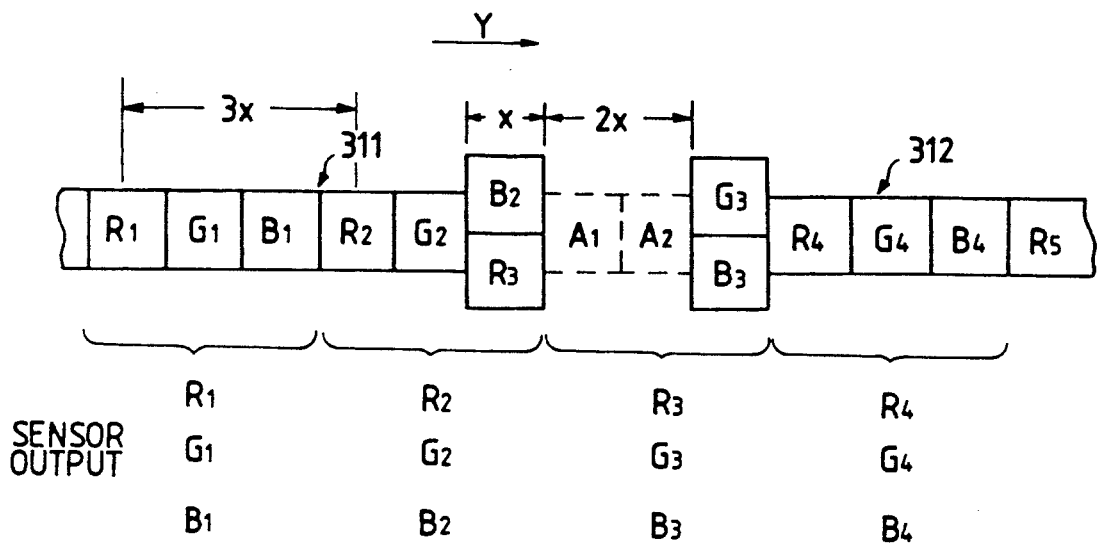
FIG. 35 is an explanatory view showing an arrangement of pixels of semiconductor sensor chips in a color photoelectric conversion apparatus according to the 31st embodiment of the present invention.

FIG. 35 is an explanatory view showing an arrangement of pixels of semiconductor sensor chips in a color photoelectric conversion apparatus according to the 31st embodiment of the present invention.

Figure 1:
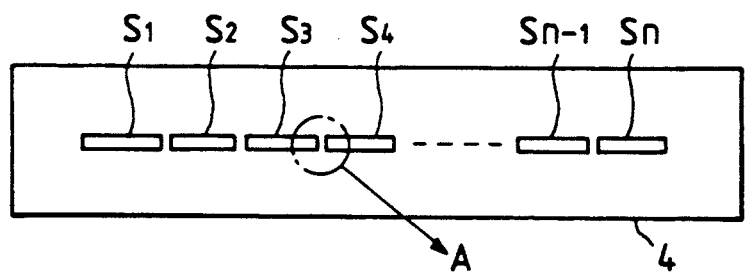
FIG. 1 is a schematic plan view of a conventional multi-chip system semiconductor image sensor.
Figure 2:
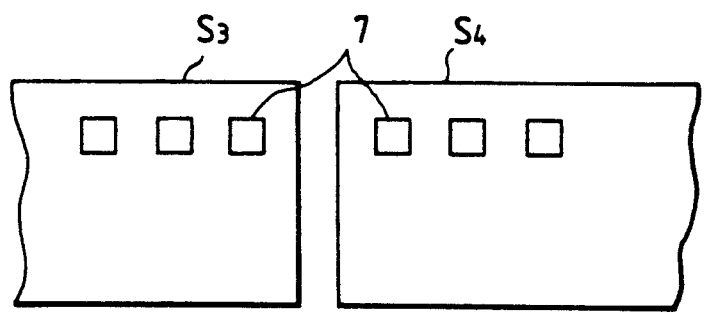
FIG. 2 is an enlarged view of a portion A of the multi-chip system semiconductor image sensor.
Figure 3:
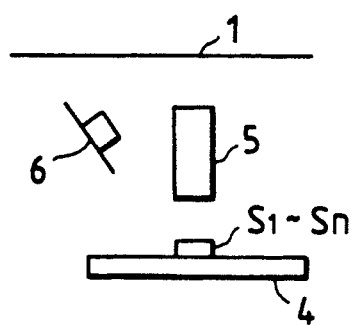
FIG. 3 is a diagram showing an optical system using the multi-chip system semiconductor image sensor.
Figure 6:
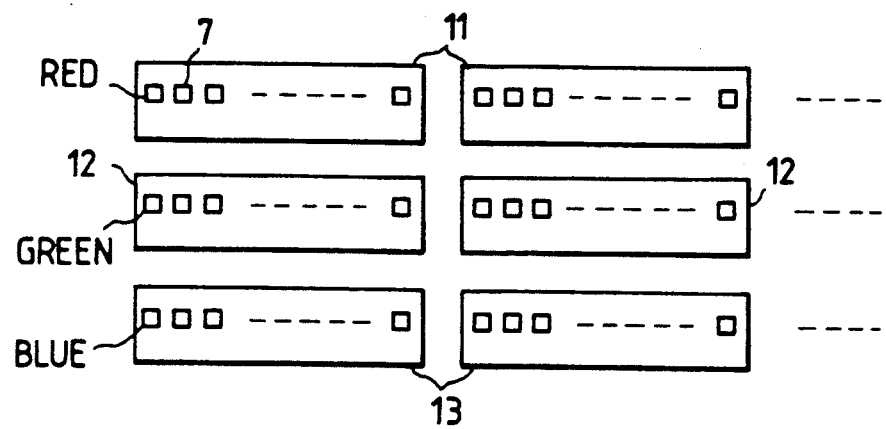
FIG. 6 is an explanatory view showing an arrangement of semiconductor image sensors.

Note that the arrangement of the semiconductor sensor chips is the same as that shown in FIG. 1. The same reference numerals in FIGS. 35 to 43 denote the corresponding parts.

As shown in FIG. 35, a nonsensitive region without pixels is present between adjacent semiconductor sensor chips 311 and 312. The width of the nonsensitive region is 2x, i.e., twice a pixel pitch (pitch of color filters) x. More specifically, the nonsensitive region corresponds to two pixels, and is illustrated as nonsensitive regions $A_1$ and $A_2$ in FIG. 35. Interpolation pixels corresponding to the nonsensitive regions $A_1$ and $A_2$ are pixels $R_3$ and $B_3$, respectively.

As shown in FIG. 35, in this embodiment, the pixel $R_3$ corresponding to the nonsensitive region $A_1$ is arranged in a direction (subscanning direction) perpendicular to an array direction of pixels (main scanning direction; a Y direction in FIG. 35) on an end portion of a pixel array on the semiconductor sensor chip 311, and a pixel $B_2$ and the pixel $R_3$ are juxtaposed in a direction perpendicular to the array direction of the pixels. The pixel $B_3$ corresponding to the nonsensitive region $A_2$ is arranged in a direction (subscanning direction) perpendicular to the array direction of the pixels (main scanning direction) on an end portion of a pixel array on the semiconductor sensor chip 312, and a pixel $G_3$ and the pixel $B_3$ are juxtaposed in a direction perpendicular to the array direction of the pixels.

A pixel pitch in units of primary colors (e.g., between $R_1$ and $R_2$) is 1.5 times (3x) the width 2x of the nonsensitive region. Even when image sampling positions of the pixels $R_3$ and $B_3$ are offset by the distance x, the influence is small. In order to further reduce this influence, an optical filter causing an optical path offset of the distance 1.5x can be arranged on the element. Alternatively, a pixel opening portion may be formed to decrease a spatial frequency.

A sensor signal output method of this embodiment is a method wherein signal phases of pixels R and B are caused to coincide with a signal from a central pixel G of the color light-receiving element (pixels R, G, and B), thereby simultaneously reading out these signals, as shown in FIG. 35.

Figure 36:
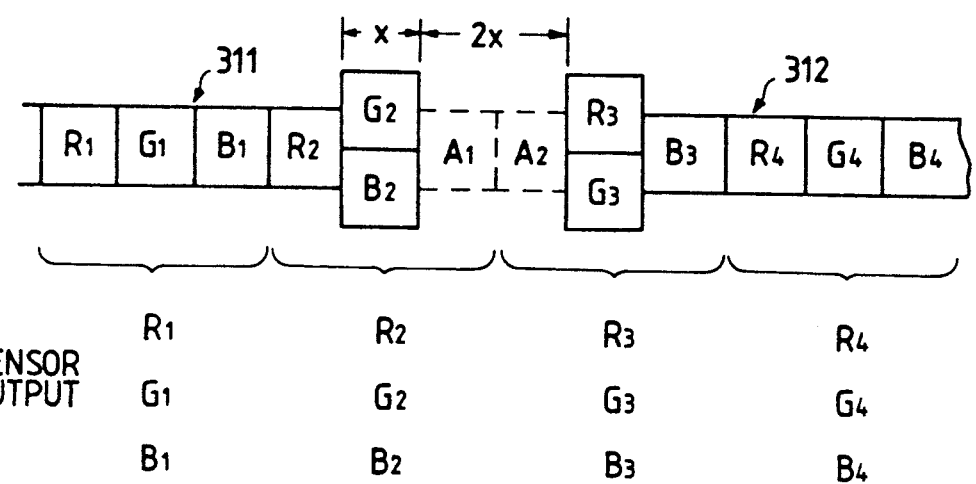
FIG. 36 is an explanatory view showing an arrangement of pixels of semiconductor sensor chips in a color photoelectric conversion apparatus according to the 32nd embodiment of the present invention.

FIG. 36 is an explanatory view showing an arrangement of pixels of semiconductor sensor chips in a color photoelectric conversion apparatus according to the 32nd embodiment of the present invention.

In this embodiment, pixels $B_2$ and $R_3$ are used as interpolation pixels. In a sensor signal output method of this embodiment, signal phases of pixels $R_3$ and $B_3$ are caused to coincide with a signal from a pixel $G_3$, thus simultaneously reading out these signals.

An arrangement and an operation of the color photoelectric conversion apparatus will be described below.

Figure 37:
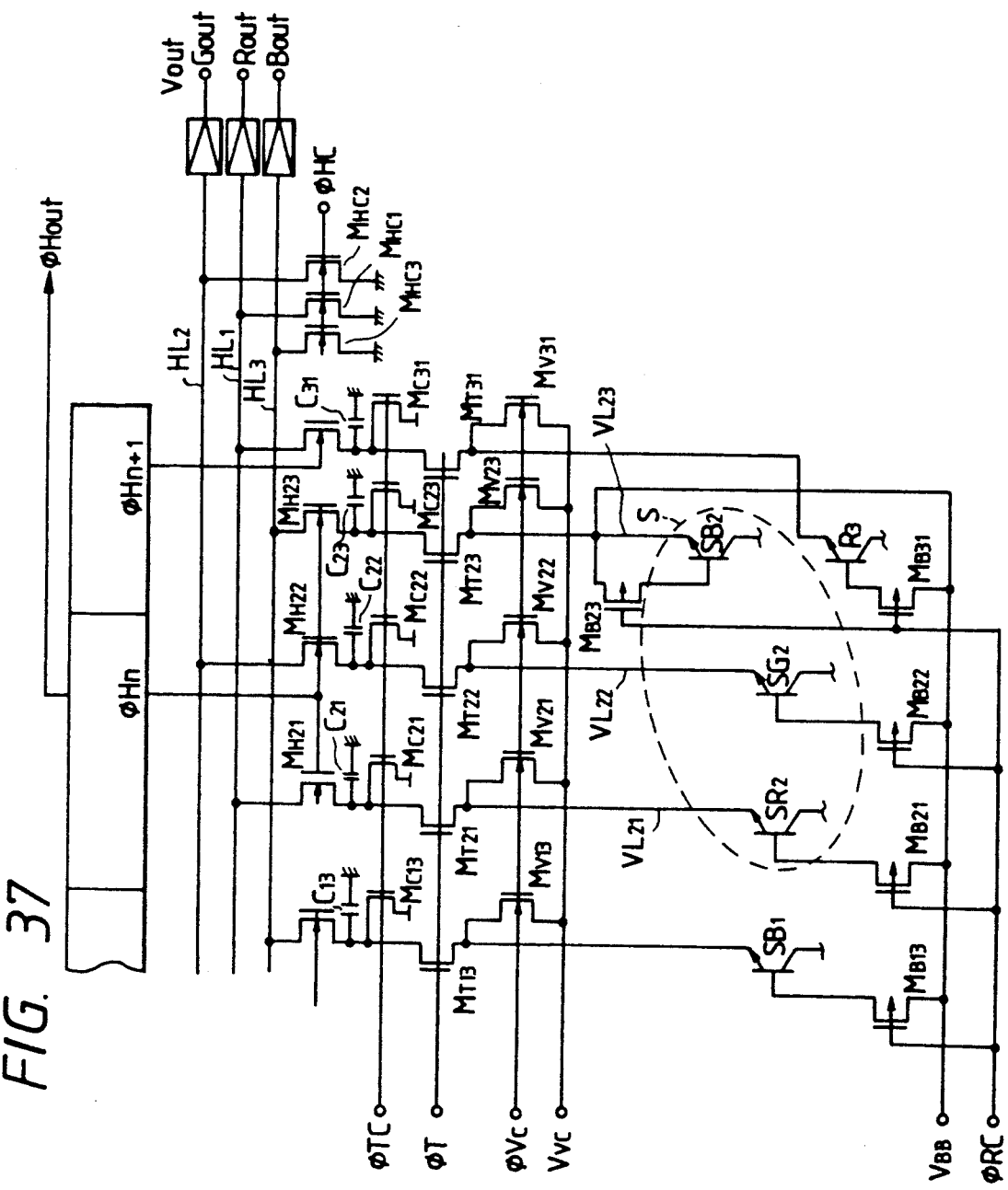
FIG. 37 is a circuit diagram of a signal read circuit of the color photoelectric conversion apparatus.

FIG. 37 is a circuit diagram of a signal read circuit of the color photoelectric conversion apparatus.

Figure 38:
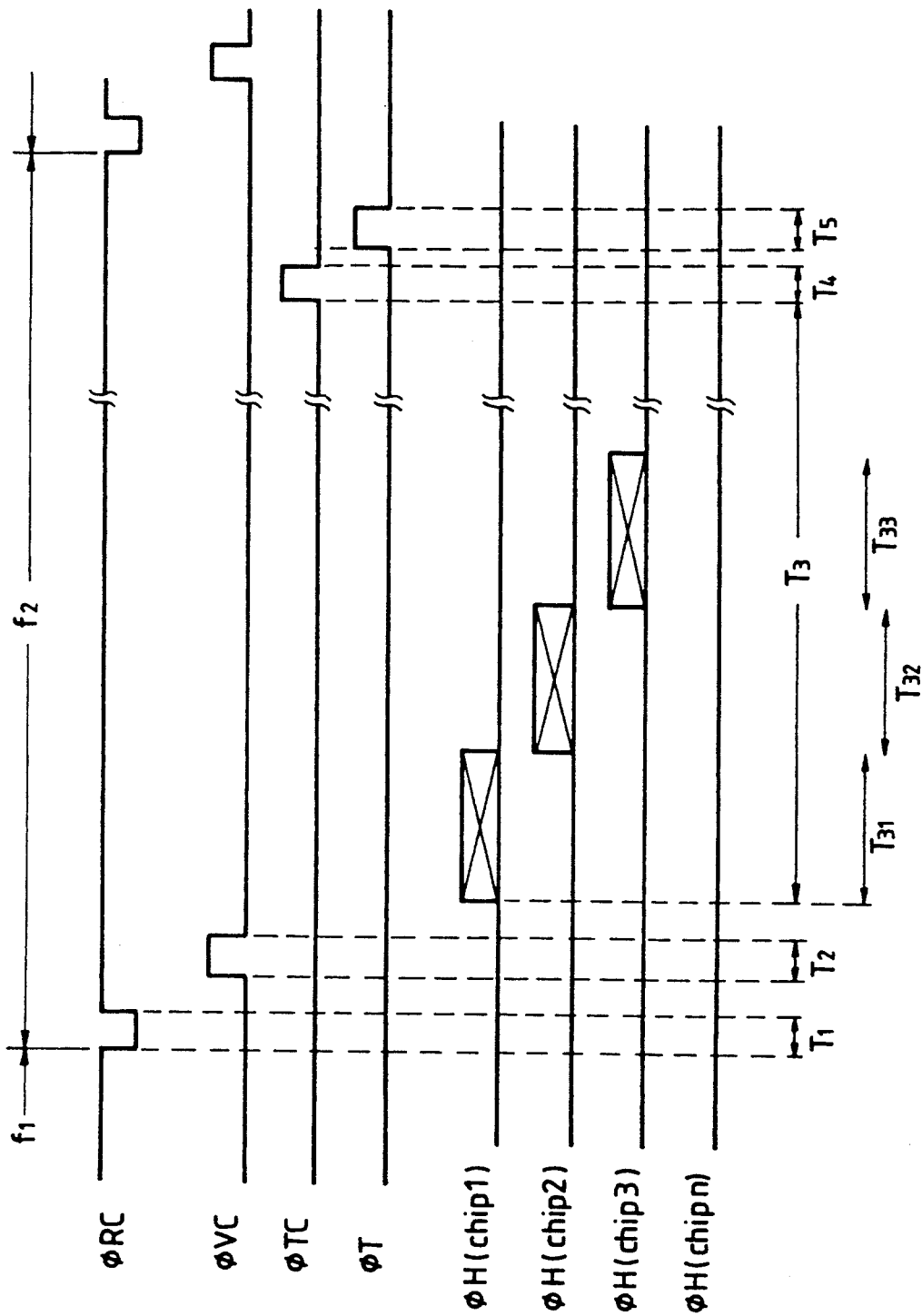
FIG. 38 is a timing chart for explaining an operation of the signal read circuit.

FIG. 38 is a timing chart for explaining the operation of the signal read circuit.

As shown in FIG. 37, a photoelectric conversion sensor is a bipolar sensor, and one color light-receiving element S is constituted by sensors $SR_2$, $SG_2$, and $SB_2$, as enclosed in a broken circle. Note that two pixels are juxtaposed on the end portion of the pixel array of each semiconductor sensor chip like in the 31st embodiment shown in FIG. 35, and an output from the pixel $R_3$ is output simultaneously with outputs from pixels $G_3$ and $B_3$ of the next semiconductor sensor chip. For the sake of simplicity, only an arrangement of a signal read circuit portion associated with the sensors $SR_2$, $SG_2$, and $SB_2$ will be described below.

Light charges of corresponding light beams passing through color filters R, G, and B are accumulated on the base regions of the sensors $SR_2$, $SG_2$, and $SB_2$, respectively. Signal charges amplified in correspondence with the light charges are respectively accumulated on capacitors $C_{21}$, $C_{22}$, and $C_{23}$ from the emitters of the sensors $SR_2$, $SG_2$, and $SB_2$ via MOS transistors $M_{T21}$, $M_{T22}$, and $M_{T23}$. The signals transferred to the capacitors $C_{21}$, $C_{22}$, and $C_{23}$ are transferred to horizontal output lines $HL_1$, $HL_2$, and $HL_3$ via MOS transistors $M_{H21}$, $M_{H22}$, and $M_{H23}$ which are controlled by a pulse $\phi_{Hn}$ from a scanning circuit, and are then simultaneously output as output signals $R_{out}$, $G_{out}$, and $B_{out}$ corresponding to three pixels R, G, and B.

PMOS transistors $M_{B21}$, $M_{B22}$, and $M_{B23}$ reset the bases of the sensors $SR_2$, $SG_2$, and $SB_2$ to a potential $V_{BB}$, respectively, and are controlled by a pulse $\phi_{RC}$. MOS transistors $M_{V21}$, $M_{V22}$, and $M_{V23}$ reset vertical output lines $VL_{21}$, $VL_{22}$, and $VL_{23}$ to a potential $V_{VC}$, respectively, and are controlled by a pulse $\phi_{VC}$. MOS transistors $M_{C21}$, $M_{C22}$, and $M_{C23}$ reset the capacitors $C_{21}$, $C_{22}$, and $C_{23}$ to a predetermined potential (GND in this case), respectively, and are controlled by a pulse $\phi_{TC}$. MOS transistors $M_{HC21}$, $M_{HC22}$, and $M_{HC23}$ reset the horizontal output lines $HL_1$, $HL_2$, and $HL_3$ to a predetermined potential (GND in this case), respectively, and are controlled by a pulse $\phi_{HC}$.

After output signals $G_{out}$, $R_{out}$, and $B_{out}$ of three pixels G, R, and B are output, an output from the interpolation pixel $R_3$ is transferred onto an output signal line in response to a pulse $\phi_{Hn+1}$ from the scanning circuit. At the same time, outputs from the pixels $G_3$ and $B_3$ of the next semiconductor sensor chip must be output. For this purpose, the scanning circuit for the next semiconductor sensor chip must be driven in synchronism with the pulse $\phi_{Hn+1}$. In this embodiment, the scanning circuit for the next semiconductor sensor chip is enabled by a pulse output before the pulse $\phi_{Hn+1}$, e.g., a pulse $\phi_{out}$ shown in FIG. 37.

In the pixel arrangement and the sensor signal output method of the color photoelectric conversion apparatus of the 32nd embodiment described above, the signal read circuit can be used by changing the scanning circuit and a connection method from the capacitors to the MOS transistors.

The operation of the signal read circuit will be described below with reference to FIG. 38.

In FIG. 38, a period $T_1$ is a period for resetting the bases of the sensors as photoelectric conversion units. That is, when the pulse $\phi_{RC}$ goes from HIGH level to LOW level, the PMOS transistors $M_{B21}$, $M_{B22}$, and $M_{B23}$ are enabled, and reset the bases of the sensors $SR_2$, $SG_2$, and $SB_2$, respectively.

A period $T_2$ corresponds to a transient refresh period of the sensors. That is, when the pulse $\phi_{VC}$ goes from LOW level to HIGH level, the MOS transistors $M_{V21}$, $M_{V22}$, and $M_{V23}$ are enabled, and reset the vertical output lines $VL_{21}$, $VL_{22}$, and $VL_{23}$ to the potential $V_{VC}$, respectively. In addition, the emitters of the sensors are reset to the potential $V_{VC}$. At this time, the charges left in the bases are discharged to the emitters (this process is called "transient refresh").

A period $T_3$ corresponds to a period for outputting L signals accumulated during a period $f_1$. That is, the signals accumulated on the capacitors of the semiconductor chips arranged as shown in FIG. 39A are output. The capacitors temporarily store the signals accumulated during the period $f_1$. Periods $T_{31}$, $T_{32}$, and $T_{33}$,... in the period $T_3$ correspond to periods for outputting signals from semiconductor sensor chips, respectively.

A period $T_4$ corresponds to a period for clearing residual charges on the capacitors. That is, when the pulse $\phi_{TC}$ goes from LOW level to HIGH level, the MOS transistors $M_{C21}$, $M_{C22}$, and $M_{C23}$ are enabled, and the residual charges on the capacitors $C_{21}$, $C_{22}$, and $C_{23}$ are cleared.

A period $T_3$ corresponds to a period for charge-amplifying signals of the photoelectric conversion units of each semiconductor sensor chip, which signals are accumulated during a period $f_2$, and transferring the amplified signals to the capacitors. Note that the following arrangements of pixels of semiconductor sensor chips in the color photoelectric conversion apparatus of the present invention are also available.

Figure 39:
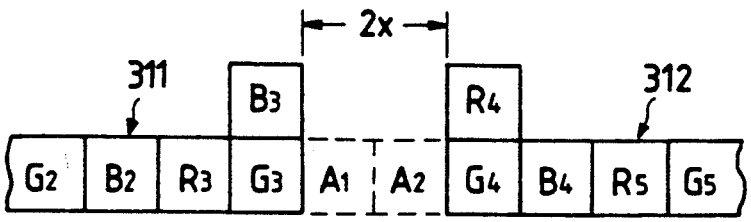
FIG. 39 is an explanatory view showing an arrangement of pixels of semiconductor sensor chips in a color photoelectric conversion apparatus according to the 33rd embodiment of the present invention.

FIG. 39 is an explanatory view of an arrangement of pixels of semiconductor sensor chips in a color photoelectric conversion apparatus according to the 33rd embodiment of the present invention.

This embodiment places an importance on equal sampling pitches of pixels G, and interpolation pixels $B_3$ and $R_4$ are arranged above pixels $G_3$ and $G_4$ (or may be below the pixels $G_3$ and $G_4$) in a direction (subscanning direction) perpendicular to the main scanning direction).

In each of the 31st to 33rd embodiments described above, the nonsensitive region corresponds to twice the pixel pitch (pitch of color filters) x. When the nonsensitive region is larger than the pitch x, three or more pixels are juxtaposed in a direction perpendicular to the main scanning direction, and output signals from the remaining pixels of the three or more pixels, excluding one pixel, can be used as output signals from a region corresponding to a joint between adjacent color photoelectric transducers.

When the nonsensitive region corresponds to an odd-numbered multiple of the pixel pitch (pitch of color filters) x, the number of pixels juxtaposed in a direction perpendicular to the main scanning direction on one of adjacent semiconductor sensor chips may be set to be different from the number of pixels juxtaposed in a direction perpendicular to the main scanning direction on the other semiconductor sensor chip.

Figure 40A:
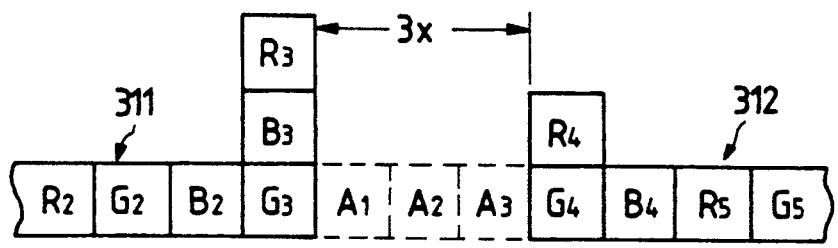
FIGS. 40A and 40B are explanatory views showing arrangements of pixels of semiconductor sensor chips of color photoelectric conversion apparatuses according to the 34th and 35th embodiments of the present invention.
Figure 40B:
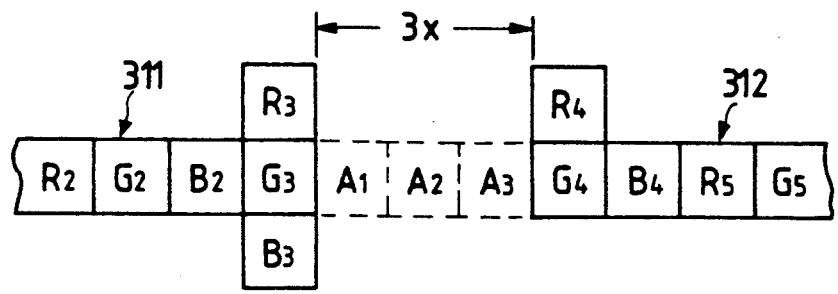

FIGS. 40A and 40B are explanatory views showing arrangements of pixels of semiconductor sensor chips in a color photoelectric conversion apparatus according to the 34th and 35th embodiments of the present invention.

When a nonsensitive region corresponds to three times a pixel pitch x, as shown in FIG. 40A, interpolation pixels $R_3$ and $B_3$ corresponding to nonsensitive regions $A_1$ and $A_2$ can be arranged above a pixel $G_3$ of one sensor chip (may be below the pixel $G_3$), and an interpolation pixel $R_4$ corresponding to a nonsensitive region $A_3$ can be arranged above a pixel $G_4$ (may be arranged below the pixel $G_4$) of the other semiconductor sensor chip. Note that the pixels $R_3$ and $B_3$ may be arranged on two sides of the pixel $G_3$, as shown in FIG. 40B.

Figure 41:
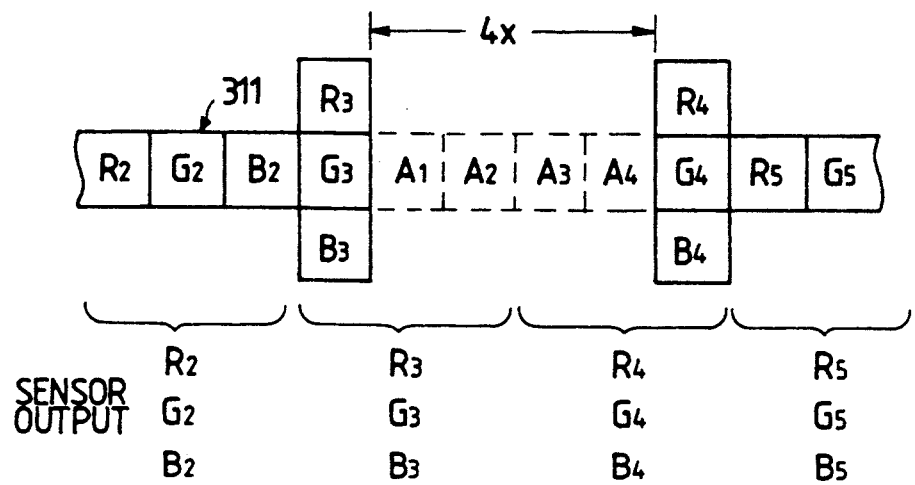
FIG. 41 is an explanatory view showing an arrangement of pixels of semiconductor sensor chips in a color photoelectric conversion apparatus according to the 36th embodiment of the present invention.

FIG. 41 is an explanatory view showing an arrangement of pixels of semiconductor sensor chips in a color photoelectric conversion apparatus according to the 36th embodiment of the present invention.

This embodiment exemplifies an arrangement of pixels when a nonsensitive region corresponds to four times a pixel pitch x.

As shown in FIG. 41, in this embodiment, interpolation pixels $R_3$ and $B_3$ corresponding to nonsensitive regions $A_1$ and $A_2$ are arranged on two sides of a pixel $G_3$ of one semiconductor sensor chip, and interpolation pixels $R_4$ and $B_4$ corresponding to nonsensitive regions $A_3$ and $A_4$ are arranged on two sides of a pixel $G_4$ of the other semiconductor sensor chip.

In the above embodiments, the number of colors is three, i.e., R, G, and B. However, the present invention may be applied to two colors or four or more colors.

Figure 42A:
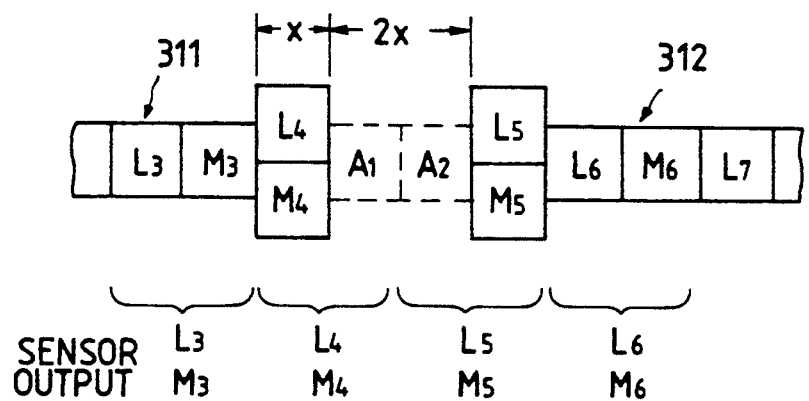
FIGS. 42A and 42B are explanatory views showing arrangements of pixels of semiconductor sensor chips of color photoelectric conversion apparatuses according to the 37th and 38th embodiments of the present invention.
Figure 42B:
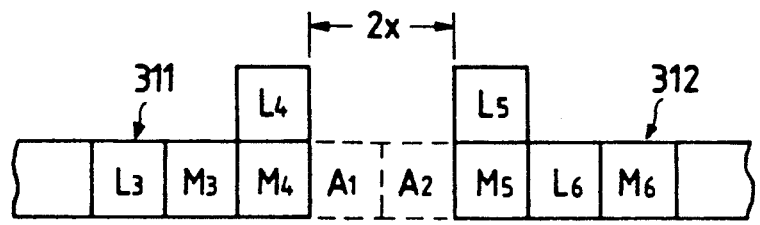

FIGS. 42A and 42B are explanatory views showing arrangements of pixels of semiconductor sensor chips in a color photoelectric conversion apparatus according to the 37th and 38th embodiments of the present invention.

These embodiments exemplify pixel arrangements when the number of colors is two.

In these embodiments, two colors are represented by L and M.

In FIG. 42A, middle positions between pixels $L_4$ and $M_4$, and between pixels $L_5$ and $M_5$ coincide with the center of other pixels aligned in the main scanning direction In FIG. 42B, a pixel $M_4$ is arranged in the same manner as other pixels aligned in the main scanning direction, and pixels $L_4$ and $L_5$ are respectively arranged above pixels $M_4$ and $M_5$ (or may be arranged below the pixels $M_4$ and $M_5$).

Figure 43A:
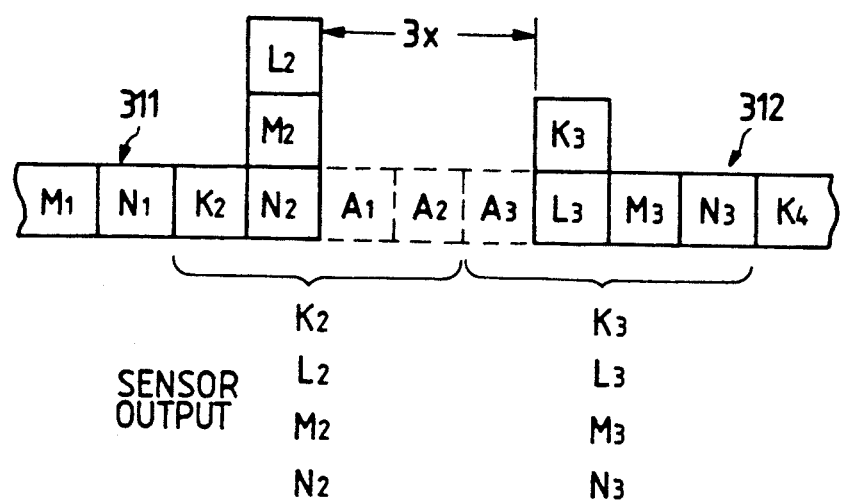
FIGS. 43A and 43B are explanatory views showing arrangements of pixels of semiconductor sensor chips of color photoelectric conversion apparatuses according to the 39th and 40th embodiments of the present invention.
Figure 43B:
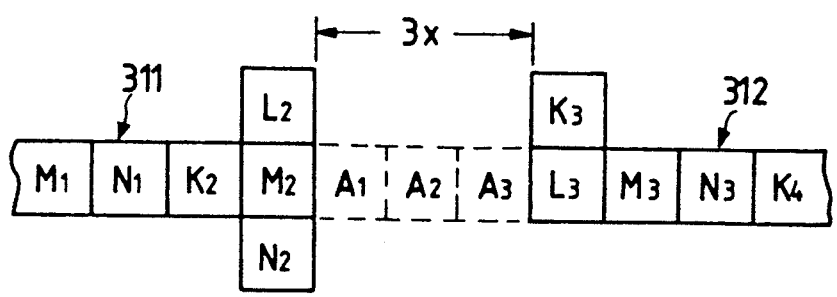

FIGS. 43A and 43B are explanatory views showing arrangements of pixels of semiconductor sensor chips in a color photoelectric conversion apparatus according to the 39th and 40th embodiments of the present invention.

These embodiments exemplify pixel arrangements when the number of colors is four.

In these embodiments, four colors are represented by K, L, M, and N.

FIG. 43A shows a case wherein pixels $L_2$ and $M_2$ are arranged above a pixel $N_2$ (or may be arranged below the pixel $N_2$). FIG. 43B shows a case wherein pixels $L_2$ and $N_2$ of two out of four colors are arranged on two sides of a pixel $M_2$.

As described in detail above, according to the color photoelectric conversion apparatuses of the 31st to 40th embodiments, two or more pixels are juxtaposed in a direction perpendicular to the main scanning direction on an end portion of a pixel array, aligned in the main scanning direction, of one of adjacent color photoelectric transducers, and an output signal from at least one of two or more juxtaposed pixels is used as an output signal from a region corresponding to a joint between the adjacent color photoelectric transducers, so that moire generated in the region corresponding to the joint between the adjacent color photoelectric transducers can be eliminated. According to the present invention, since pixels are aligned in a line in the main scanning direction, and need not employ a staggered arrangement, no special memory is required.

Therefore, an inexpensive color photoelectric conversion apparatus having excellent performance can be provided.

What is claimed is:

1. A multi-chip color image sensor in which a plurality of semiconductor image sensors each having a plurality of light-receiving windows are arrayed, and in which one color light-receiving element corresponds to a plurality of light-receiving windows in a main scanning direction, wherein some or all of the plurality of light-receiving windows which correspond to the one color light-receiving element on an end portion of each of said semiconductor image sensors are juxtaposed in a subscanning direction.

2. A sensor according to claim 1, wherein one of the plurality of light-receiving windows juxtaposed in the subscanning direction is arranged on an extending line of the remaining light-receiving windows which are arranged to be parallel to a main scanning direction.

3. A sensor according to claim 1, wherein a distance from an outer edge of a first light-receiving window to an outer edge of an nth light-receiving window of the plurality of (n) light-receiving windows juxtaposed in the subscanning direction is not more than n times a pitch of the remaining light-receiving windows aligned in the main scanning direction.

4. A sensor according to claim 1, wherein a distance between a central position in the main scanning direction of the plurality of (n) light-receiving windows juxtaposed in the subscanning direction and a central position in the main scanning direction of a light-receiving window neighboring the plurality of light-receiving windows, juxtaposed in the subscanning direction, of the identical semiconductor image sensor is twice a pitch of the remaining light-receiving windows aligned in the main scanning direction.

5. A sensor according to claim 1, wherein color filters in different colors are arranged on the plurality of light-receiving windows juxtaposed in the subscanning directions, and said color filters in different colors are sequentially arranged on the remaining light-receiving windows.

6. A sensor according to claim 5, wherein some or all of said color filters in different colors have a combination selected from red, green, and blue, or cyan, magenta, and yellow.

7. A sensor according to claim 1, wherein each of said sensors comprises a plurality of photoelectric conversion units, and said light-receiving windows have a one-to-one correspondence with said photoelectric conversion units.

8. A sensor according to claim 7, wherein each of said photoelectric conversion units has an amplification function.

9. A sensor according to claim 1, wherein a plurality of photoelectric conversion units constituting one color light-receiving element simultaneously outputs photoelectric conversion outputs.

10. A color photoelectric conversion apparatus which has a plurality of pixels having a plurality of color filters, and in which a plurality of color photoelectric transducers each of which is constituted by arranging said plurality of pixels in a main scanning direction are arrayed in the main scanning direction, wherein at least two pixels are juxtaposed in a direction perpendicular to the main scanning direction on an end portion of a pixel array arranged in the main scanning direction of at least one of adjacent color photoelectric transducers, and an output signal from at least one of the at least two juxtaposed pixels is used as an output signal from a region corresponding to a joint between the adjacent color photoelectric transducers.

11. An apparatus according to claim 10, wherein said plurality of filters include R, G, and B filters or Ye, Cy, Ma, and G filters.

12. An apparatus according to claim 10, wherein said plurality of filters are arrayed in a predetermined repetition order.

13. A color photoelectric conversion apparatus which has a plurality of pixels having a plurality of color filters, and in which a plurality of color photoelectric transducers each of which is constituted by arranging said plurality of pixels in a main scanning direction are arrayed in the main scanning direction, wherein at least two pixels are juxtaposed in a direction perpendicular to the main scanning direction on an end portion of a pixel array arranged in the main scanning direction of each of adjacent color photoelectric transducers, and an output signal from at least one of the at least two juxtaposed pixels is output from each of the adjacent color photoelectric transducers, and is used as an output signal from a region corresponding to a joint between the adjacent color photoelectric transducers.

14. An apparatus according to claim 13, wherein the number of pixels juxtaposed in a direction perpendicular to the main scanning direction on one of the adjacent color photoelectric transducers is different from the number of pixels juxtaposed in a direction perpendicular to the main scanning direction on the other color photoelectric transducer.

15. An apparatus according to claim 13, wherein said plurality of filters include R, G, and B filters or Ye, Cy, Ma, and G filters.

16. An apparatus according to claim 13, wherein said plurality of filters are arrayed in a predetermined repetition order.

17. A color image sensor constituted by arranging a plurality of sensor means in a predetermined direction at predetermined intervals, each sensor having a plurality of photoelectric conversion means arrayed in the predetermined direction, comprising:
- a plurality of color filters corresponding to said plurality of photoelectric conversion means, and arrayed in a predetermined repetition order; and
- signal read means for causing said plurality of photoelectric conversion means to output photoelectric conversion signals,
- wherein said signal read means is driven to be able to interpolate a signal at a position between adjacent sensor means with outputs from predetermined photoelectric conversion means from the adjacent sensor means.

18. A sensor according to claim 17, wherein said signal read means simultaneously causes the adjacent sensor means to simultaneously read out a plurality of photoelectric conversion means.

19. A sensor according to claim 18, wherein said plurality of color filters include R, G, and B filters, or Ye, Cy, G, and Ma filters.

20. A sensor according to claim 18, wherein the photoelectric conversion means at an end portion of each of said plurality of sensor means includes a plurality of photoelectric transducers arrayed in a direction perpendicular to the predetermined direction.

* * * * *

UNITED STATES PATENT AND TRADEMARK OFFICE
CERTIFICATE OF CORRECTION

PATENT NO. : 5,315,412
DATED : May 24, 1994
INVENTOR(S) : AKIO MIHARA, ET AL.

Page 1 of 2

It is certified that error appears in the above-identified patent and that said Letters Patent is hereby corrected as shown below:

COLUMN 2

Line 8, "a" should be deleted and "(light" should read --(a light--.

COLUMN 15

Line 7, "element. In" should read --element. ¶ In--.

COLUMN 19

Line 34, "pulse $\phi_{Nh+1}$," should read --pulse $\phi_{Hn+1}$,--.

COLUMN 21

Line 14, close up right margin.
Line 15, close up left margin.

COLUMN 23

Line 31, "L" should be deleted.
Line 49, "capacitors. Note" should read --capacitors. ¶ Note--.

COLUMN 24

Line 56, "rection" should read --rection.--.

UNITED STATES PATENT AND TRADEMARK OFFICE
CERTIFICATE OF CORRECTION

PATENT NO.  : 5,315,412
DATED       : May 24, 1994
INVENTOR(S) : AKIO MIHARA, ET AL.

It is certified that error appears in the above-identified patent and that said Letters Patent is hereby corrected as shown below:

COLUMN 25

Line 12, close up right margin.
Line 13, close up left margin.

Signed and Sealed this

Twentieth Day of December, 1994

Attest:

BRUCE LEHMAN

Attesting Officer

Commissioner of Patents and Trademarks